(12) United States Patent
Miyazaki et al.

(10) Patent No.: US 7,620,965 B2
(45) Date of Patent: Nov. 17, 2009

(54) INFORMATION PROCESSING APPARATUS AND METHOD, INFORMATION PROVIDING APPARATUS AND METHOD, AND PROGRAM STORAGE MEDIUM

(75) Inventors: Takuma Miyazaki, Tokyo (JP); Yusuke Tani, Kanagawa (JP)

(73) Assignee: Sony Corporation, Tokyo (JP)

( * ) Notice: Subject to any disclaimer, the term of this patent is extended or adjusted under 35 U.S.C. 154(b) by 984 days.

(21) Appl. No.: 09/911,911

(22) Filed: Jul. 24, 2001

(65) Prior Publication Data

US 2002/0046401 A1    Apr. 18, 2002

(30) Foreign Application Priority Data

Jul. 26, 2000  (JP)  ............... 2000-225682

(51) Int. Cl.
*H04N 7/10* (2006.01)
(52) U.S. Cl. ............... 725/42; 725/50; 725/132; 725/140; 386/1; 386/83
(58) Field of Classification Search ............ 725/32–36, 725/37, 39, 42, 50, 51, 61, 131–134, 139–142; 386/1, 83, 86
See application file for complete search history.

(56) References Cited

U.S. PATENT DOCUMENTS

| | | | | |
|---|---|---|---|---|
| 6,177,931 B1 * | 1/2001 | Alexander et al. | ............ | 725/52 |
| 6,240,555 B1 * | 5/2001 | Shoff et al. | ............ | 725/110 |
| 6,415,099 B1 * | 7/2002 | Berger | ............ | 386/83 |
| 6,536,041 B1 * | 3/2003 | Knudson et al. | ............ | 725/39 |
| 6,577,808 B1 * | 6/2003 | Oestreicher et al. | ............ | 386/68 |
| 6,588,015 B1 * | 7/2003 | Eyer et al. | ............ | 725/89 |
| 6,671,454 B1 * | 12/2003 | Kaneko et al. | ............ | 386/83 |
| 6,698,020 B1 * | 2/2004 | Zigmond et al. | ............ | 725/34 |
| 6,704,929 B1 * | 3/2004 | Ozer et al. | ............ | 725/13 |
| 6,756,997 B1 * | 6/2004 | Ward et al. | ............ | 715/716 |
| 6,826,351 B1 * | 11/2004 | Tsujisawa et al. | ............ | 386/83 |
| 6,956,833 B1 * | 10/2005 | Yukie et al. | ............ | 370/328 |
| 7,328,450 B2 * | 2/2008 | Macrae et al. | ............ | 725/42 |
| 7,454,626 B2 * | 11/2008 | Hirata | ............ | 713/189 |
| 7,503,057 B2 * | 3/2009 | Rosin et al. | ............ | 725/44 |
| 2001/0029610 A1 * | 10/2001 | Corvin et al. | ............ | 725/42 |
| 2002/0010927 A1 * | 1/2002 | Kim | ............ | 725/40 |
| 2002/0032907 A1 * | 3/2002 | Daniels | ............ | 725/51 |
| 2002/0046407 A1 * | 4/2002 | Franco | ............ | 725/110 |
| 2003/0196201 A1 * | 10/2003 | Schein et al. | ............ | 725/42 |
| 2004/0168188 A1 * | 8/2004 | Bennington et al. | ............ | 725/41 |
| 2005/0028208 A1 * | 2/2005 | Ellis et al. | ............ | 725/58 |
| 2005/0198668 A1 * | 9/2005 | Yuen et al. | ............ | 725/47 |
| 2008/0127265 A1 * | 5/2008 | Ward et al. | ............ | 725/42 |

* cited by examiner

*Primary Examiner*—Annan Q Shang
(74) *Attorney, Agent, or Firm*—Frommer Lawrence & Haug LLP; William S. Frommer; Paul A. Levy

(57) ABSTRACT

An information processing apparatus and an information processing method are disclosed. A personal computer receives a program guide and displays it. Then, the personal computer sends information for identifying a user-specified program to an iEPG site. In response, the iEPG site generates preset recording data corresponding to the user-specified program and acquires advertisement-associated data. Then, the iEPG site sends the generated preset recording data and the acquired advertisement-associated data to the personal computer. Thus, the apparatus and method can make users of preset recording data view advertisement.

21 Claims, 28 Drawing Sheets

FIG. 11

NEW PRESET RECORDING...SET CHANNEL AND START DATE AND TIME

SET CHANNEL AND START DATAE AND TIME FOR PRESET RECORDING

| CHANNEL | CH18 F TV ▶ |
| --- | --- |
| START DATE | FEBRUARY 28, 1999 ▶ |
| START TIME | 16 O'CLOCK ▶  30 MINUTES ▶ |

CANCEL   NEXT   HELP

FIG. 13

NEW PRESET RECORDING···CONFIRM SETTINGS

DO YOU WANT PRESET RECORDING AS FOLLOWS?

| | |
|---|---|
| START TIME: | FEBRUARY 16, 1999  16:30 |
| END TIME: | FEBRUARY 16, 1999  18:30 |
| CHANNEL: | 18  F TV |
| RECORD MODE: | STANDARD |
| PERIODICAL PRESET RECORDING: | ONCE |
| CONTENT VALID PERIOD: | NONE |
| CONTENT NAME: | HOGE HOGE |
| STORAGE LIBRARY: | TEMPORARY STORAGE |
| MEMO: | |

[CANCEL] [RETURN] [COMPLETE] [HELP]

FIG.14

| TV GUIDE | | CH11 MHK GENERAL | | CH13 MHK EDUCATION | | CH14 DAI NIPPON TV | | CH16 YBS |
|---|---|---|---|---|---|---|---|---|
| 19:00 | 0 | 7 P.M. NEWS ▽TODAY'S NEWS ▽SPORTS CORNER ▽FOREIGN EXCHANGE AND STOCK NEWS ▽WEATHER INFORMATION CASTER 251-1 [R] | 0 | AFTER-SCHOOL CLUB "WELCOME JUNIOR FELLOWS" 251-5 [R] | 0 | PROFESSIONAL BASEBALL "GIANTS VS CHUNICHI" TOKYO DOME COMMENTATOR: GENDAI TOSHU ANNOUNCER: SINKAN SABURO 251-10 [R] | 0 | THE SUN OF FEBRUARY TV "24 HOURS OF EMERGENCY HOSPITAL" 251-11 [R] |
| | 57 | TV MAP | 30 | SIGN LANGUAGE CORNER 251-6 [R] | | | | |
| | | | 45 | TOMORROW'S HEALTH 251-7 [R] | | | | |
| 20:00 | 0 | DRAMA 251-2 "NANDARA KANDARA" 251-3 [R] | 0 | WITH YOU TONIGHT 251-8 [R] | | | | |
| | 45 | LOCAL WEATHER 251-4 [R] | 30 | LET'S LEARN BRAILLE 251-9 [R] | | | | |

250

RETURN

FIG. 15

Content-type:application/x-tv-program-info:charset=shift_jis
version : 1
station : DAI NIPPON TV
year : 1999
month : 04
date : 06
start : 21:00
end : 21:03
program-title : TUESDAY SUSPENSE QUIZE

WHO COMMITTED IT ?

FIG. 16

11, 0, 0, 11, MHK GENERAL, MHK GENERAL, MHK
13, 0, 0, 13, MHK EDUCATION, MHK EDUCATION, MHK2
14, 0, 0, 14, DAI NIPPON TV, DAI NIPPON TV,
DAI NIPPON TV NETWORK, DTV
15, 0, 0, 15, SCOPE, SCOPE
16, 0, 0, 16, YOKOHAMA BROADCASTING,
YOKOHAMA BROADCASTING, , YBS TV, YBS
18, 0, 0, 18, F TV, F TV, F TELEVISION, F TELEVISION

FIG. 20

| | CH 14<br>DAI NIPPON TV | CH 16<br>YBS TV |
|---|---|---|
| 8:00 | R CONFECTIONERY COMPANY GAM CM<br>http://www.rkashi.co.jp/~CM/mint.gif<br>http://www.rkashi.co.jp/ | H ELECTRIC COMPANY CLEANER CM<br>http://www.hdenki.co.jp/~CM/duster.mov<br>http://www.hdenki.co.jp/ |
| 8:10 | | |
| 8:20 | | |
| 8:30 | S ELECTRIC COMPANY ROBOT CM<br>http://www.sdenki.co.jp/~CM/robot.gif<br>http://www.sdenki.co.jp/ | |
| 8:40 | | H ELECTRIC COMPANY CLEANER CM<br>http://www.hdenki.co.jp/~CM/duster.mov<br>http://www.hdenki.co.jp/ |
| 8:50 | | |
| 9:00 | | |
| 9:10 | | |
| 9:20 | | |
| 9:30 | | H ELECTRIC COMPANY REFRIGERATOR CM<br>http://www.hdenki.co.jp/~CM/refr.mov<br>http://www.hdenki.co.jp/ |
| 9:40 | | |
| 9:50 | | |
| 10:00 | | |
| 10:10 | | |
| 10:20 | | |
| 10:25 | | |

FIG.21

| | CH 14<br>DAI NIPPON TV | CH 16<br>YBS TV |
|---|---|---|
| 8:00 | ZOOM MORNING | EXPRESS SHOW |
| 8:10 | NEWS, VARIETY, WEATHER FORECAST, LOCAL, ANNOUNCER TERASAWA, ARRICOT FLOWERING INFORMATION, CAMP | NEWS, VARIETY, WEATHER FORECAST, LOCAL, NAME AUGURY, CRAB COOKING, UMEDA SEIKO, HOW TO PREVENT COLD CATCHING |
| 8:20 | | |
| 8:30 | ALL ABOUT S ELECTRIC COMPANY<br>DOCUMENTARY S ELECTRIC COMPANY YAMAGUCHI NOBUYUKI, RUNING MAN, WAIO, KAIBO TeraPocket, WEGA, PLAY STAND | MARKET SHOW<br>WIDE SHOW, VARIETY, TELESHOPPING, HOUSEWIVES, ANIMAL AUGURY, HOW TO TIDY, FOOD ADDITIVES |
| 8:40 | | |
| 8:50 | | |
| 9:00 | | |
| 9:10 | | |
| 9:20 | | |
| 9:30 | | |
| 9:40 | | |
| 9:50 | | |
| 10:00 | | |
| 10:10 | | |
| 10:20 | | CHOICEST GOODS MALL |
| 10:25 | | CHOICEST GOODS, LACQUER WARE, WAJIMA |

FIG.22

| CM TITLE | ADVERTISEMENT FILE NAME | PROGRAM KEYWORD |
|---|---|---|
| TeraPocketCM | http://www.sdenki.co.jp/~CM/TP.gif | ○○○○<br>△△△△<br>××××<br>****<br>□□□□<br>%%%% |
| WAIO CM | http://www.sdenki.co.jp/~CM/WAIO.gif | ○○○○<br>△△△△<br>****<br>$$$$ |

MS3

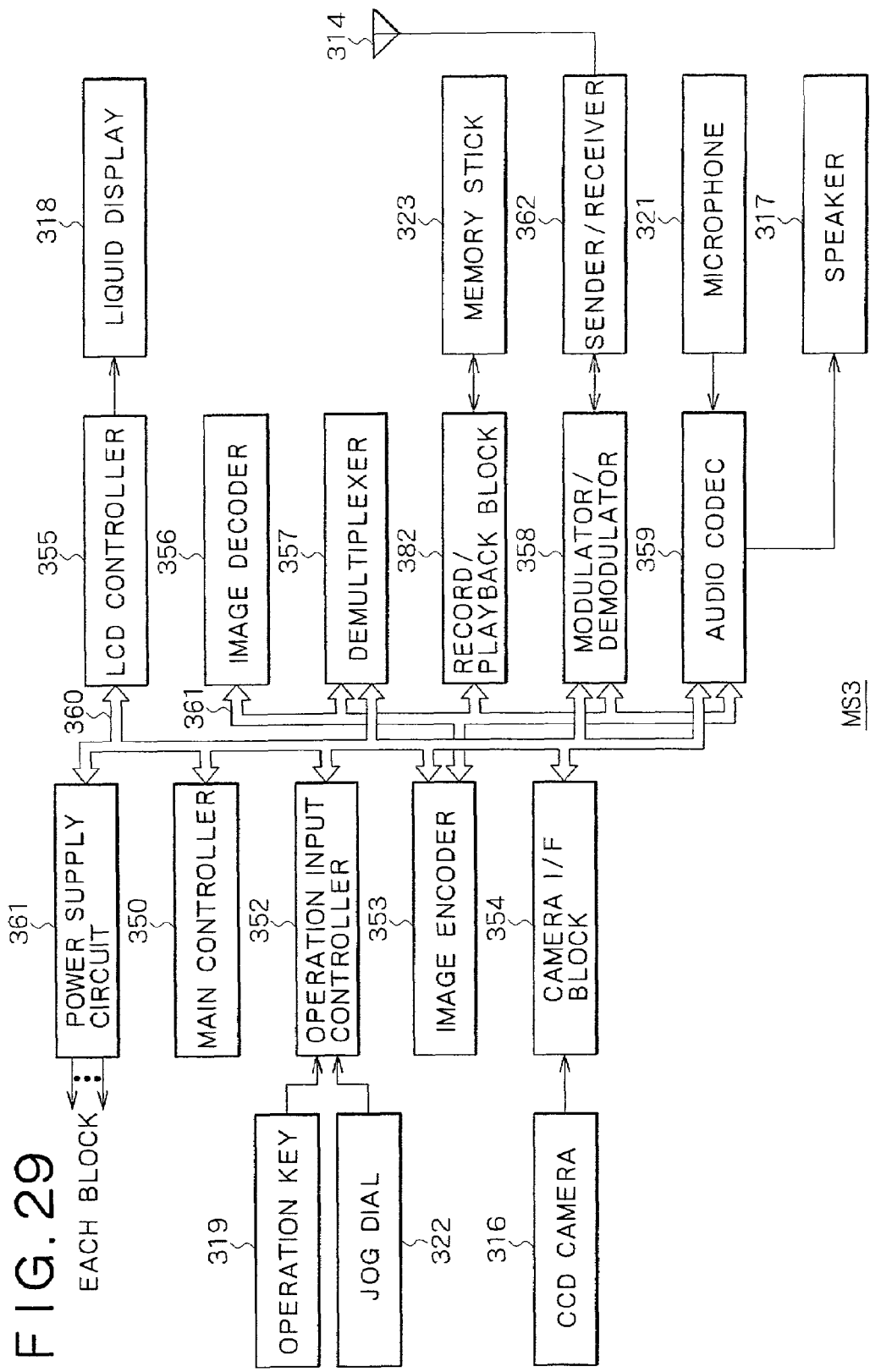

INFORMATION PROCESSING APPARATUS AND METHOD, INFORMATION PROVIDING APPARATUS AND METHOD, AND PROGRAM STORAGE MEDIUM

BACKGROUND OF THE INVENTION

The present invention relates generally to an information processing apparatus and method, an information providing apparatus and method, and a program storage medium and, more particularly, to an information processing apparatus and method, an information providing apparatus and method, and a program storage medium for receiving television broadcast signals for example and programmed-recording the received television broadcast signals or have them programmed-recorded.

Personal computers are known which receive television broadcast signals, convert their video and audio signals into predetermined digital signals, store the digital signals in a storage medium such as a hard disk, and reproduce the stored signals as required.

As such personal computers are popularized and, if the practice of recording television programs in personal computers for playback becomes popular, the advertisements (or so-called commercials) broadcast between the programs in television broadcasting is expected to have no value because these personal computers can easily playback the recorded programs by skipping the commercials. This makes it impossible to force the viewers to be exposed to these TV commercials.

SUMMARY OF THE INVENTION

In view of the foregoing, the present invention has been made, and an object of the present invention is to provide an information processing apparatus and method, an information providing apparatus and method, and a program storage medium for forcefully exposing viewers who record television programs into their personal computers for playback to the commercials accompanying the television programs.

According to a first aspect of the present invention, there is provided an information processing apparatus which acquires preset-recording data for preset-recording a television program from a predetermined information providing apparatus via a network and, on the basis of said preset-recording data, controls preset-recording of the television program, including: selecting means for selecting the television program to be preset-recorded; transmitting means for transmitting television program identifying information for identifying the television program selected by the selecting means to the information providing apparatus; receiving means for receiving the preset-recording data and advertisement-associated data from the information providing apparatus in response to the television program identifying information; recording means for recording the television program to an information recording medium on the basis of the preset-recording data received by the receiving means; reproducing means for reproducing the television program recorded to the information recording medium by the recording means; and display control means for controlling the displaying of the advertisement-associated data received by the receiving means.

According to a second aspect of the present invention, there is provided an information processing method for an information processing apparatus which acquires preset-recording data for preset-recording a television program from a predetermined information providing apparatus via a network and, on the basis of the preset-recording data, controls preset-recording of the television program, the information processing method including the steps of: selecting the television program to be preset-recorded; transmitting television program identifying information for identifying the television program selected in the selecting step to the information providing apparatus; receiving the preset-recording data and advertisement-associated data from the information providing apparatus in response to the television program identifying information; recording the television program to an information recording medium on the basis of the preset-recording data received in the receiving step; reproducing the television program recorded to the information recording medium in the recording step; and controlling the displaying of the advertisement-associated data received in the receiving step.

According to a third aspect of the present invention, there is provided a program storage medium storing a computer-readable program for controlling an information processing apparatus which acquires preset-recording data for preset-recording a television program from a predetermined information providing apparatus via a network and, on the basis of the preset-recording data, controls preset-recording of the television program, the computer-readable program including the steps of: selecting the television program to be preset-recorded; transmitting television program identifying information for identifying the television program selected in the selecting step to the information providing apparatus; receiving the preset-recording data and advertisement-associated data from the information providing apparatus in response to the television program identifying information; recording the television program to an information recording medium on the basis of the preset-recording data received in the receiving step; reproducing the television program recorded to the information recording medium in the recording step; and controlling the displaying of the advertisement-associated data received in the receiving step.

With the configurations of the above described first to third aspects of the present invention, preset-recording data and advertisement-associated data are received from an information providing apparatus, a television program is recorded on an information recording medium on the basis of the received preset-recording data, and the recorded television program is reproduced during which the displaying of the received advertisement-associated data is controlled. Consequently, by use of the preset-recording data, the present invention can display advertisements at the same time the preset-recorded television program is displayed.

According to a fourth aspect of the present invention, there is provided an information processing apparatus which acquires preset-recording data for preset-recording a television program from a predetermined information providing apparatus via a network and, on the basis of the preset-recording data, controls preset-recording of the television program, including: selecting means for selecting the television program to be preset-recorded; transmitting means for transmitting television program identifying information for identifying the television program selected by the selecting means to the information providing apparatus; first receiving means for receiving advertisement-associated data from the information providing apparatus in response to the television program identifying information; display control means for controlling the displaying of the advertisement-associated data received by the first receiving means; notification means for notifying, if a predetermined condition is satisfied after the displaying of the advertisement-associated data is started by the display control means, the information providing apparatus thereof; second receiving means for receiving the preset-recording data from the information providing apparatus in response to the notification from the notifying means; and recording means for recording the television program to an information recording medium on the basis of the preset-recording data received by the second receiving means.

According to a fifth aspect of the present invention, there is provided an information processing method for an information processing apparatus which acquires preset-recording data for preset-recording a television program from a predetermined information providing apparatus via a network and, on the basis of the preset-recording data, controls preset-recording of the television program, the information processing method including the steps of: selecting the television program to be preset-recorded; transmitting television program identifying information for identifying the television program selected in the selecting step to the information providing apparatus; receiving advertisement-associated data from the information providing apparatus in response to the television program identifying information; controlling the displaying of the advertisement-associated data received in the first receiving step; notifying the information providing apparatus thereof if a predetermined condition is satisfied after the displaying of the advertisement-associated data is started in the display control step; receiving the preset-recording data from the information providing apparatus in response to the notification from the notifying step; and recording the television program to an information recording medium on the basis of the preset-recording data received in the second receiving step.

According to a sixth aspect of the present invention, there is provided a program storage medium storing a computer-readable program for controlling an information processing apparatus which acquires preset-recording data for preset-recording a television program from a predetermined information providing apparatus via a network and, on the basis of the preset-recording data, controls preset-recording of the television program, the computer-readable program including the steps of: selecting the television program to be preset-recorded; transmitting television program identifying information for identifying the television program selected in the selecting step to the information providing apparatus; receiving advertisement-associated data from the information providing apparatus in response to said television program identifying information; controlling the displaying of the advertisement-associated data received in the first receiving step; notifying the information providing apparatus thereof if a predetermined condition is satisfied after the displaying of the advertisement-associated data is started in the display control step; receiving the preset-recording data from the information providing apparatus in response to the notification from the notifying step; and recording the television program to an information recording medium on the basis of the preset-recording data received in the second receiving step.

With the configurations of the above described fourth to sixth aspects of the present invention, the displaying of advertisement-associated data supplied from an information providing apparatus is controlled and, if a predetermined condition is satisfied after the displaying of the advertisement-associated data is started, the information thereof is sent to the information providing apparatus. A television program is recorded on an information recording medium on the basis of the preset-recording data supplied from the information providing apparatus in response to the above-mentioned information. Consequently, advertisements can be displayed for those users who use the preset-recording data.

According to a seventh aspect of the present invention, there is provided an information providing apparatus which provides preset-recording data for preset-recording a television program to an information processing apparatus via a network, including: receiving means for receiving a television program identifying information from the information processing apparatus; generating means for generating the preset-recording data for preset-recording the television program corresponding to the television program identifying information; acquiring means for acquiring advertisement-associated data corresponding to the television program identifying information from a predetermined site; and transmitting means for transmitting the preset-recording data generated by the generating means and the advertisement-associated data acquired by the acquiring means to the information processing apparatus.

According to an eighth aspect of the present invention, there is provided an information providing method for an information providing apparatus which provides preset-recording data for preset-recording a television program to an information processing apparatus via a network, said information providing method comprising the steps of: receiving a television program identifying information from said information processing apparatus; generating the preset-recording data for preset-recording the television program corresponding to the television program identifying information; acquiring advertisement-associated data corresponding to the television program identifying information from a predetermined site; and transmitting said preset-recording data generated in the generating step and the advertisement-associated data acquired by the acquiring means to the information processing apparatus.

According to a ninth aspect of the present invention, there is provided a program storage medium storing a computer-readable program for controlling an information providing apparatus which provides preset-recording data for preset-recording a television program to an information processing apparatus via a network, the computer-readable program including the steps of: receiving a television program identifying information from the information processing apparatus; generating the preset-recording data for preset-recording the television program corresponding to the television program identifying information; acquiring advertisement-associated data corresponding to the television program identifying information from a predetermined site; and transmitting the preset-recording data generated in the generating step and the advertisement-associated data acquired by the acquiring step to the information processing apparatus.

With the configurations of the above described seventh to ninth aspects of the present invention, preset-recording data for preset-recording a television program corresponding to program identifying information, advertisement-associated data corresponding to the television program identifying information is obtained from a predetermined site, and the generated preset-recording data and the obtained advertisement-associated data are sent to an information processing apparatus. Consequently, advertisements can be displayed to the user of the information processing apparatus that uses the preset-recording data.

BRIEF DESCRIPTION OF THE DRAWINGS

These and other objects of the invention will be seen by reference to the description, taken in connection with the accompanying drawing, in which:

FIG. 11 illustrates an exemplary display screen displayed by a preset-recording setting program 104;

FIG. 13 illustrates still another exemplary display screen displayed by the preset-recording setting program 104;

FIG. 14 illustrates an exemplary display screen of a program guide 250 displayed by a WWW browser 106;

FIG. 15 illustrates an example of preset-recording data;

FIG. 16 illustrates an example of a channel conversion file;

FIG. 20 illustrates an exemplary relationship table listing the relationships between recording date, channel, and advertisement owned by the advertisement site 8;

FIG. 21 illustrates an exemplary relationship table listing the relationships between recording date, channel, and program keyword own by the keyword site 8;

FIG. 22 illustrates an exemplary relationship table listing the relationships between program keyword and advertisement owned by the advertisement site 8;

FIG. 29 is a block diagram illustrating an exemplary electrical configuration of the camera-attached digital mobile telephone MS3.

DETAILED DESCRIPTION OF PREFERRED EMBODIMENTS

Figure 1:
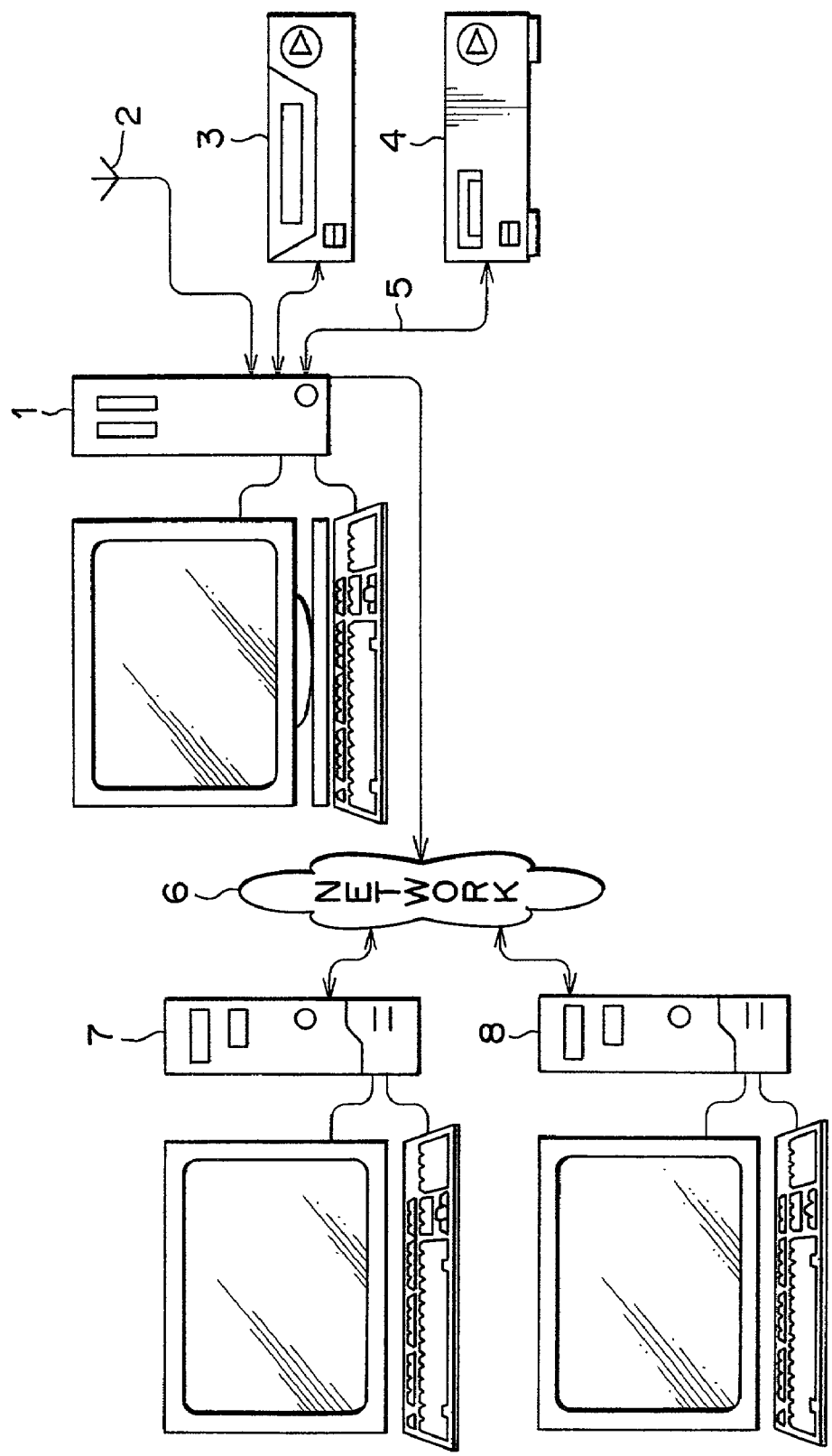
FIG. 1 is a schematic diagram illustrating an image recording/reproducing system practiced as one embodiment of the invention.

Hereinafter, embodiments of this invention will be described in further detail with reference to the accompanying drawings. Now referring to FIG. 1, there is shown a typical configuration of an image recording/reproducing system to which the present invention is applied. A personal computer 1 practiced as a first embodiment of an information processing apparatus according to the invention captures a signal supplied from an antenna 2 which has received a radio wave transmitted from a predetermined television station, reproduces predetermined image and audio signals (so-called program image and audio signals), and records these image and audio signals. Also, the personal computer 1 reproduces image and audio signals corresponding to the analog signals supplied from a VCR (Video Cassette Recorder) 2 or the digital data supplied from a DVCR (Digital Video Cassette Recorder) 4 via a bus network 5 such as the IEEE (Institute of Electrical and Electronics Engineers) 1394 standard and records the reproduced image and audio signals.

The personal computer 1 supplies the analog signals corresponding to the recorded image and audio signals to the VCR 3 or the digital data corresponding to the recorded image and audio signals to the DVCR 4.

Further, the personal computer 1 transmits to a server 7 a message requesting for the transmission of the data (hereafter, referred to as "preset-recording data") for preset-recording a predetermined program to be broadcast by a predetermined television station by following a communication procedure such as HTTP (Hyper Text Transfer Protocol) via a network 6 such as Ethernet or the Internet.

The server 7 is a so-called Web server which publicizes television program guides as Web content. The server 7 receives from the computer 1 a message for requesting the transmission of preset-recording data and, in response, transmits advertisement data corresponding to the preset-recording data to the personal computer 1. In what follows, the server 7 is also referred to as an iEPG (internet Electronic Program Guide) site 7.

The server 8 solicits advertisements from sponsors such as corporations or the like for the user of the personal computer 1 using the iEPG site to view the solicited advertisements. The server 8 stores the advertisement-associated data (an animation GIF file (GIF89a format) and the URL of a Web site set up by a corporation concerned) supplied from the sponsor, in relation with television programs. In response to a request from the iEPG site 7, the server 8 transmits the stored advertisement-associated data to the iEPG site via the network 6. In what follows, the server 8 is also referred to as an advertisement site 8.

The details of the iEPG site 7 and the advertisement site 8 will be described later with reference to FIG. 17.

The personal computer 1 receives the preset-recording data for preset-recording a predetermined program broadcast by a predetermined television station and advertisement data, executes a program preset-recording operation on the basis of the received preset-recording data, and reproduces the advertisement data.

Figure 2:
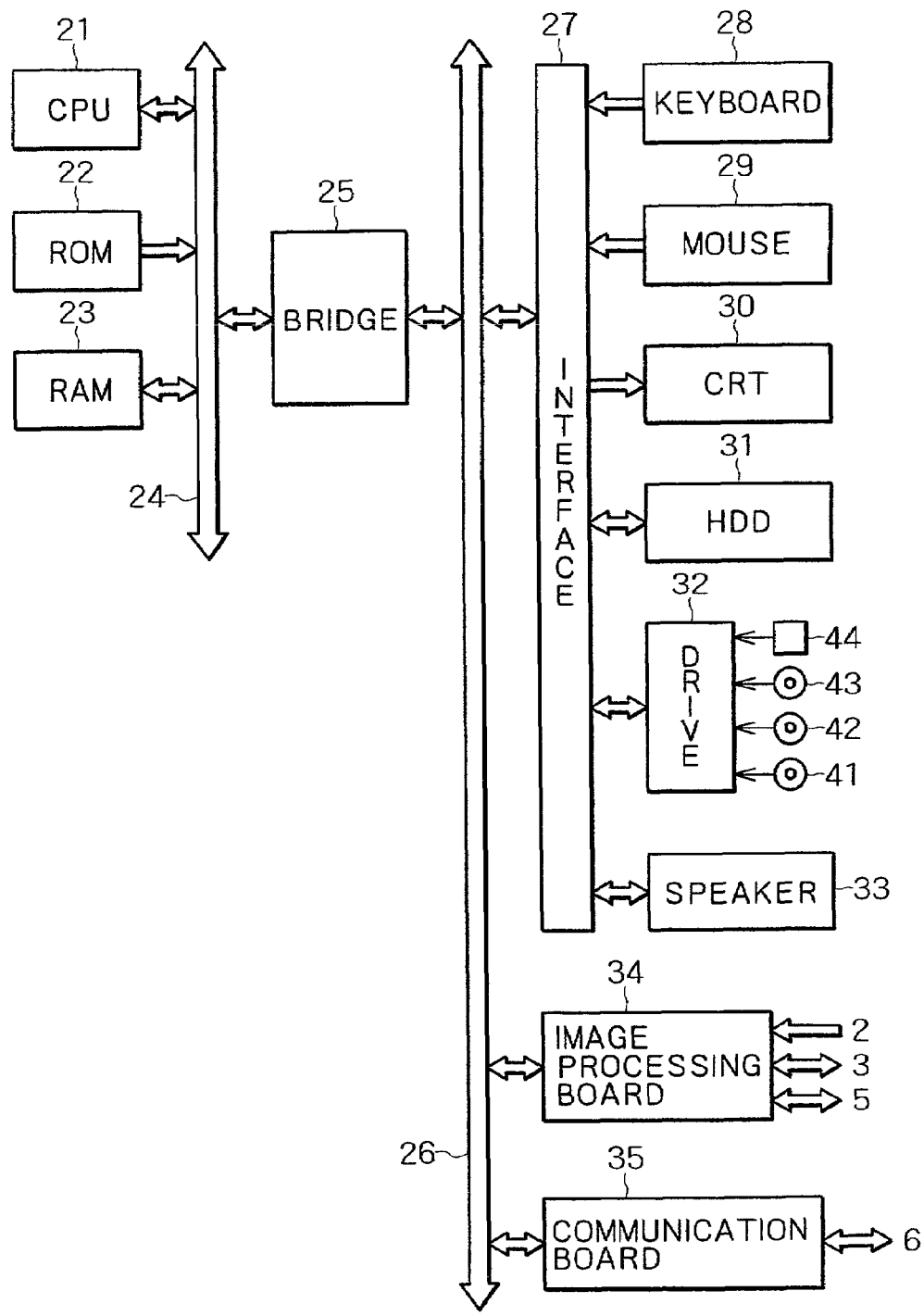
FIG. 2 is a block diagram illustrating an exemplary configuration of a personal computer 1 as an information processing apparatus shown in FIG. 1.

Referring to FIG. 2, there is shown a block diagram illustrating a typical configuration of the personal computer 1. A CPU (Central Processing Unit) 21 actually executes various application programs and a basic OS (Operating System). A ROM (Read Only Memory) 22 generally stores basically fixed data among the programs and operational parameters for use by the CPU 21. A RAM (Random Access Memory) 23 stores the programs for use in the execution by the CPU 21 and the parameters which change from time to time in the execution. These components are interconnected by a CPU bus or a host bus 24 constituted by a memory bus for example.

The host bus 24 is connected to an external bus 25 such as a PCI (Peripheral Component Interconnect/Interface) via a bridge 25.

A keyboard 28 is operated by the user when inputting various commands into the CPU 21. A mouse 29 is operated by the user when specifying or selecting a point on a display screen displayed on a CRT (Cathode Ray Tube) 30. The CRT 30 displays various kinds of information in the forms of text and images. A HDD (Hard Disk Drive) 31 drives a hard disk to record the programs and information to be executed by the CPU 21 and reproduces the stored programs and information. A drive 32 drives a magnetic disk 41, an optical disk 42, a magneto-optical disk 43, or a semiconductor memory 44 to record the programs and information to be executed by the CPU 21 and reproduces the stored programs and information. A speaker 33 reproduces a predetermined audio signal. These components, namely keyboard 28 through the speaker 33, are connected to an interface 27, which is connected to the CPU 21 via the external bus 26, the bridge 25, and the host bus 24.

An image processing board 34 generates, under the control of the CPU 21, predetermined image or audio data on the basis of a signal supplied from the antenna 2, an image or audio analog signal supplied from the VCR 3, or image or audio digital data supplied from the DVCR 4 via the bus network 5 and outputs the generated image or audio data to the HDD 31 via the external bus 26 and the interface 27.

Also, the image processing board 34 inputs the image or audio data from the HDD 31 via the external bus 26 and the interface 27, generates an analog signal corresponding to the inputted image or audio data, supplies the generated analog signal to the VCR 3, or generates digital data corresponding to the inputted image or audio data and supplies the generated digital data to the DVCR 4 via the bus network 5.

The image processing board 34 is connected to the CPU 21 via the external bus 26, the bridge 25, and the host bus 24.

A communication board 35 is a device for connecting this personal computer to the network 6. To be more specific, the communication board 35 is constituted by an Ethernet board for example and connected to the CPU 21 via the external bus 26, the bridge 25, and the host bus 24.

Figure 3:
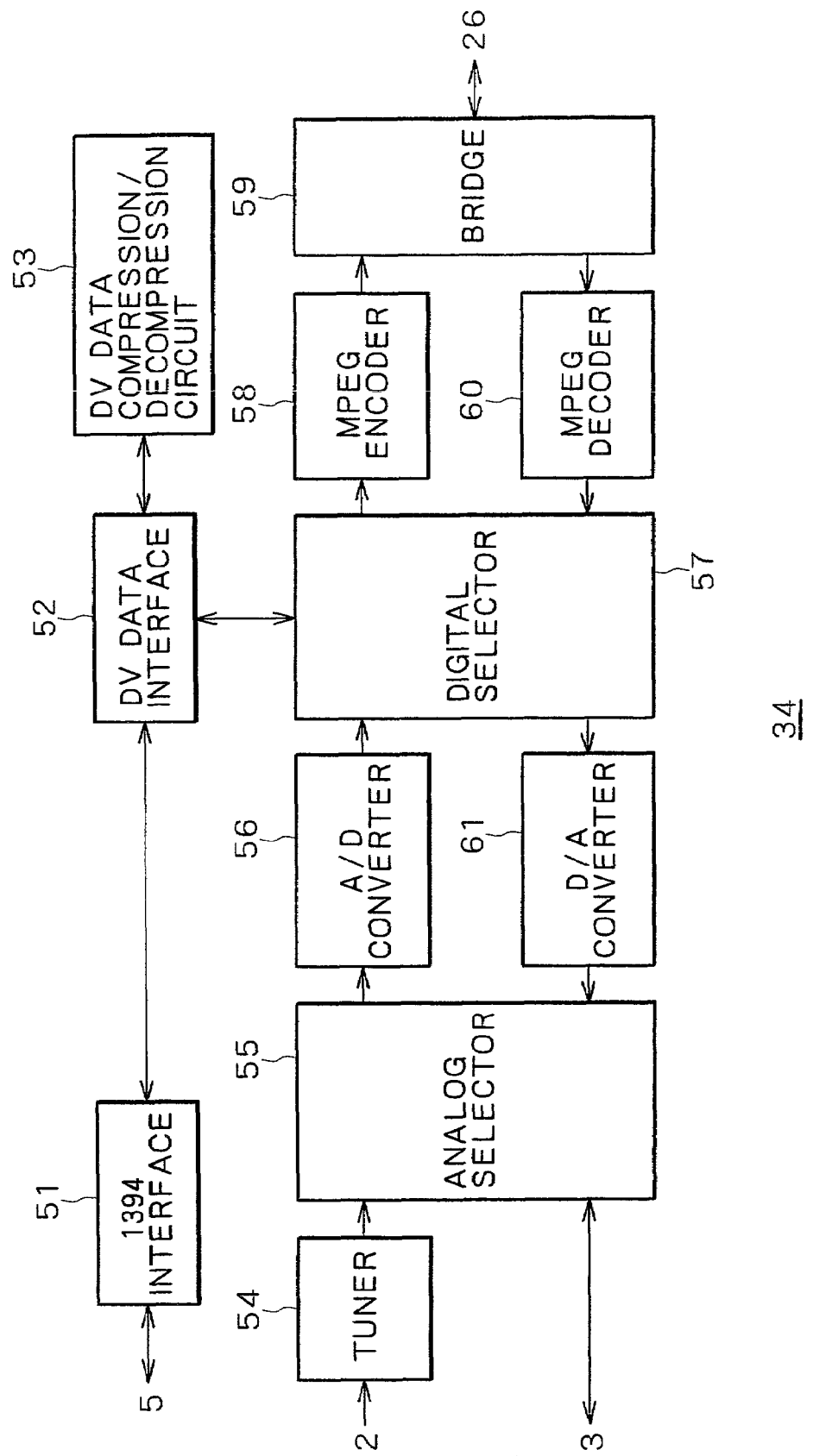
FIG. 3 is a block diagram illustrating an exemplary configuration of a image processing broad 34 shown in FIG. 2.

The following describes the configuration of the image processing board 34. Referring to FIG. 3, there is shown a block diagram of the configuration of the image processing board 34. A 1394 interface 51 has a configuration compliant with the IEEE 1394 standard, is connected to the bus network 5, receives image or audio digital data of DVCR format from the DVCR 4 on the basis of a protocol compliant with the IEEE 1394 standard, and supplies the received digital data to a DV (Digital Video) data interface 52.

Also, the 1394 interface 51 supplies image or audio digital data of DVCR format supplied from the DV data interface 52 to the DVCR 4 on the basis of a protocol compliant with the IEEE 1394 standard.

The DV data interface 52 outputs the image or audio digital data of DVCR format supplied from the 1394 interface 51 or image or audio digital data (for example, digital data not compressed by so-called 4:1:1) supplied from a digital selector 57 to a DV data compression/decompression circuit 53, outputs image or audio digital data of DVCR format supplied from the DV data compression/decompression circuit 53 to the 1394 interface 51, and outputs image or audio digital data (not compressed) supplied from the DV data compression/decompression circuit 53 to the digital selector 57.

The DV data compression/decompression circuit 53 decompresses the image or audio digital data of DVCR format supplied from the DV data interface 52 and outputs the decompressed digital data to the DV data interface 52 or compresses the uncompressed image or audio data supplied from the DV data interface 52 into the image or digital data of DVCR format and outputs the compressed digital data to the DV data interface 52.

A tuner 54 captures an RF (Radio Frequency) signal supplied from the antenna 2 and outputs an image and audio analog signals of a predetermined channel in the RF signal to an analog selector 55. The analog selector 55 selects one of image or audio analog signals supplied from the tuner 54, the VCR 3, or a D/A (Digital/Analog) converter 61 and outputs the selected analog signal to an A/D (Analog/Digital) converter 56 or the VCR 3.

The A/D converter 56 converts the image and audio analog signals supplied from the analog selector 55 into digital data (for example, image data etc. of so-called 4:1:1) and outputs the digital data to the digital selector 57. The digital selector 57 captures the image and audio digital data outputted from the DV data interface 52, the A/D converter 56, or an MPEG (Moving Picture Experts Group) decoder 60, select one of the image and audio digital data, and outputs the selected digital data to the DV data interface 52, an MPEG encoder 58, or the D/A converter 61 as well as a bridge 59.

The MPEG encoder 58 compresses the image and audio digital data supplied from the digital selector 57 into MPEG digital data and outputs the MPEG digital data to the bridge 59. Also, the MPEG encoder 58 converts a scene switching image to a still image and outputs the still image to the bridge 59.

The bridge 59 outputs the image and audio digital data (compressed) supplied from the digital selector 57 to the CRT 30 via the PCI bus 26 and the interface 27 of the personal computer 1 installed with the image processing board 34. The bridge 59 outputs the MPEG image or audio digital data supplied from the MPEG encoder 58 to the HDD 31 or the CPU 21 via the PCI bus 26 of the personal computer 1 installed with the image processing board 34. Further, the bridge 59 receives the MPEG image or audio digital data from the HDD 31 of the personal computer 1 via the PCI bus 26 and outputs the received digital data to the MPEG decoder 60.

The MPEG decoder 60 decompresses the MPEG image or audio digital data supplied from the bridge 59 and outputs the decompressed digital image or audio data to the digital selector 57.

The D/A converter 61 converts the image or audio digital data supplied from the digital selector 57 into an analog signal and outputs it to the analog selector 55.

It should be noted that the processing by the MPEG encoder 58 or the MPEG decoder 60 may alternatively be executed by the CPU 21 by use of a predetermined software program.

Figure 4:
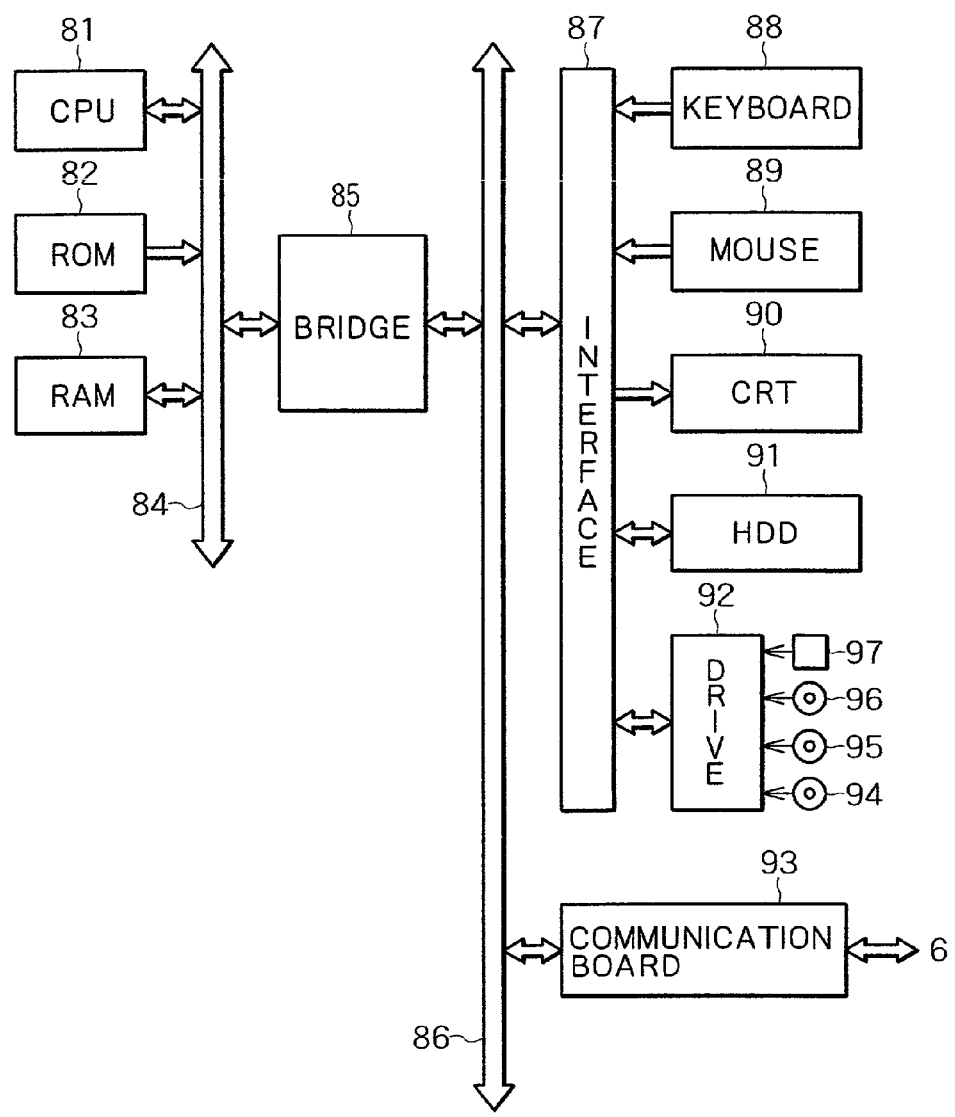
FIG. 4 is a block diagram illustrating an exemplary configuration of a server 7 shown in FIG. 1.

Referring to FIG. 4, there is shown an exemplary configuration of the server 7. A CPU 81 actually executes various application programs and a basic OS. A ROM (Read Only Memory) 82 generally stores basically fixed data among the programs and operational parameters for use by the CPU 81. A RAM (Random Access Memory) 83 stores the programs for use in the execution by the CPU 81 and the parameters which change from time to time. These components are interconnected by a CPU bus or a host bus 84 constituted by a memory bus for example.

The host bus 84 is connected to an external bus 86 such as a PCI bus via a bridge 85.

A keyboard 88 is operated by the user when inputting various commands into the CPU 81. A mouse 89 is operated by the user when specifying or selecting a point on a display screen displayed on a CRT (Cathode Ray Tube) 90. The CRT 90 displays various kinds of information in the forms of text and images. A HDD (Hard Disk Drive) 91 drives a hard disk to record the programs and information to be executed by the CPU 81 and reproduces the stored programs and information. A drive 92 drives a magnetic disk 94, an optical disk 95, a magneto-optical disk 96, or a semiconductor memory 97 to record the programs and information to be executed by the CPU 81 and reproduces the stored programs and information. These components, namely keyboard 88 through the drive 92, are connected to an interface 87, which is connected to the CPU 81 via the external bus 86, the bridge 85, and the host bus 84.

A communication board 93 is a device for connecting this personal computer to the network 6. To be more specific, the communication board 93 is constituted by an Ethernet board for example and connected to the CPU 81 via the external bus 86, the bridge 85, and the host bus 84.

It should be noted that an exemplary configuration of the server 8 is the same as that of the server 7 and there its description is skipped.

Figure 5:
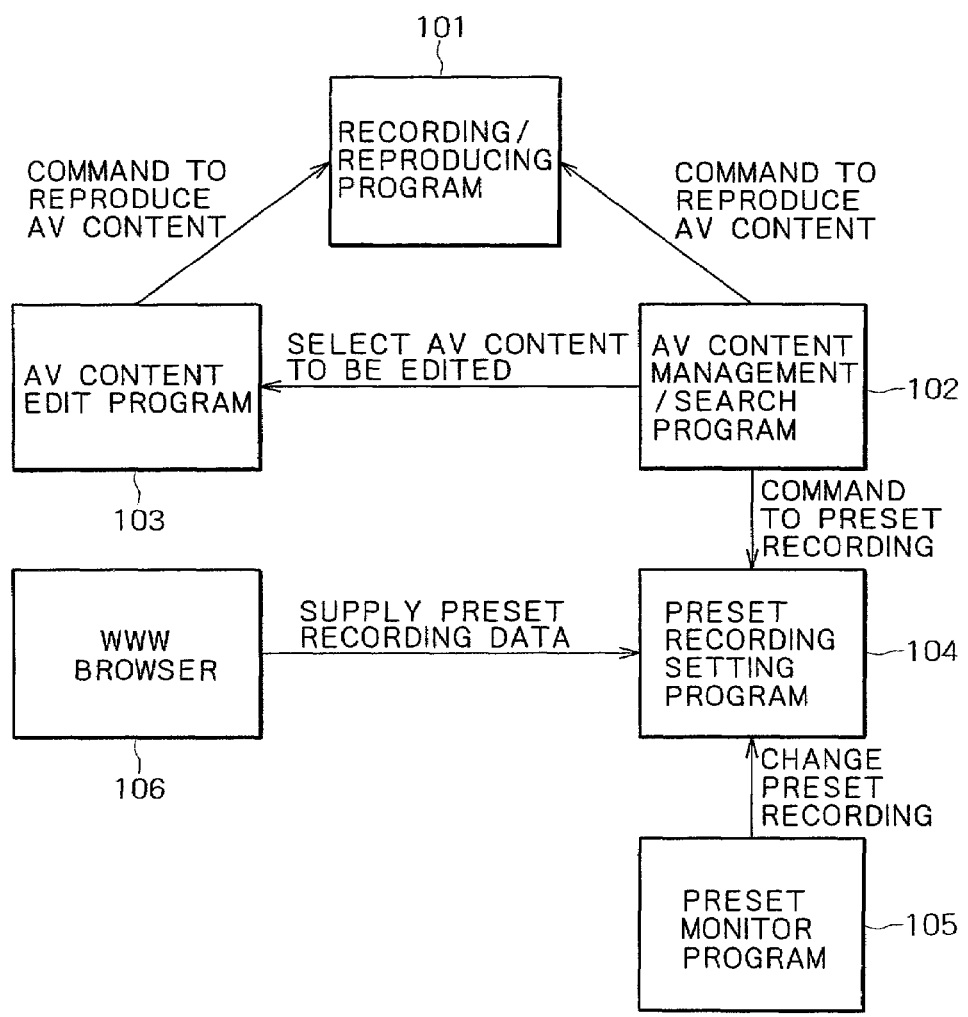
FIG. 5 illustrates the relationships between application programs to be executed by the personal computer 1.

Referring to FIG. 5, there is shown the relationship between the application programs to be executed by the personal computer 1. A recording/reproducing program 101 causes the image processing board 34 to select one of the image and audio analog signals of a predetermined channel received at the tuner 54, the image and audio analog signals supplied from the VCR 3, and the image and audio digital data supplied from the DVCR 4 via the bus network 5, convert the selected analog signals or digital data into MPEG image or audio digital data, and record the converted image or audio digital data to the HDD 31 as AV (Audio Visual) content constituted by one or more files of predetermined format.

The recording/reproducing program 101 causes the image processing board 34 to decompress the AV content stored in the HDD 31 as one or more files of predetermined format, generate decompressed image or audio digital data of predetermined format, and display the resultant image on the CRT 30 and the resultant sound the resultant audio from the speaker 33.

An AV content management search program 102 displays the contents of the AV content and predetermined information such as recording date stored in the HDD 31. The AV content management search program 102 instructs the recording/reproducing program 101 to reproduce predetermined AV content, selects the AV content to be edited, supplies the selected AV content to an AV content edit program 103, and instructs this program to perform preset recording.

The AV content edit program 103 edits (links the image and audio signals included in predetermined AV content) the predetermined image and audio signals in the selected AV content on the basis of the AV content stored in the HDD 13 and generates AV content of predetermined format for reproducing the edited image or audio signal.

This AV content has no image or audio digital data as will be described later and is constituted by the information for identifying the selected AV content and the information for identifying the image and audio to be used. The AV content can be reproduced by the recording/reproducing program 101.

A preset-recording setting program 104 generates, on the basis of the settings made, AV content to be preset-recorded. This AV content corresponds to the settings (recording time, the recording mode for specifying picture quality). For this AV content, a storage area is allocated on the HDD 31 in advance. The preset-recording setting program 104 also generates AV content for executing preset recording on the basis of he preset recording data supplied from a WWW (World Wide Web) browser 106 or an electronic mail program, not shown.

A preset-recording monitor program 105 is always operating (namely, in the so-called resident mode) when the personal computer 1 is operating (namely, the OS is operating) to execute preset recording on the basis of the AV content for executing preset recording generated by the preset recording setting program 104 and a time supplied from an RTC (Real Time Clock), not shown. Also, the preset-recording monitor program 105 changes the settings of the AV content for executing preset recording.

The WWW browser 106 requests the server 7 for predetermined preset-recording data on the basis of a predetermined procedure such as HTTP, receives the requested predetermined preset-recording data, and supplies the received data to the preset-recording setting program 104.

Figure 6:
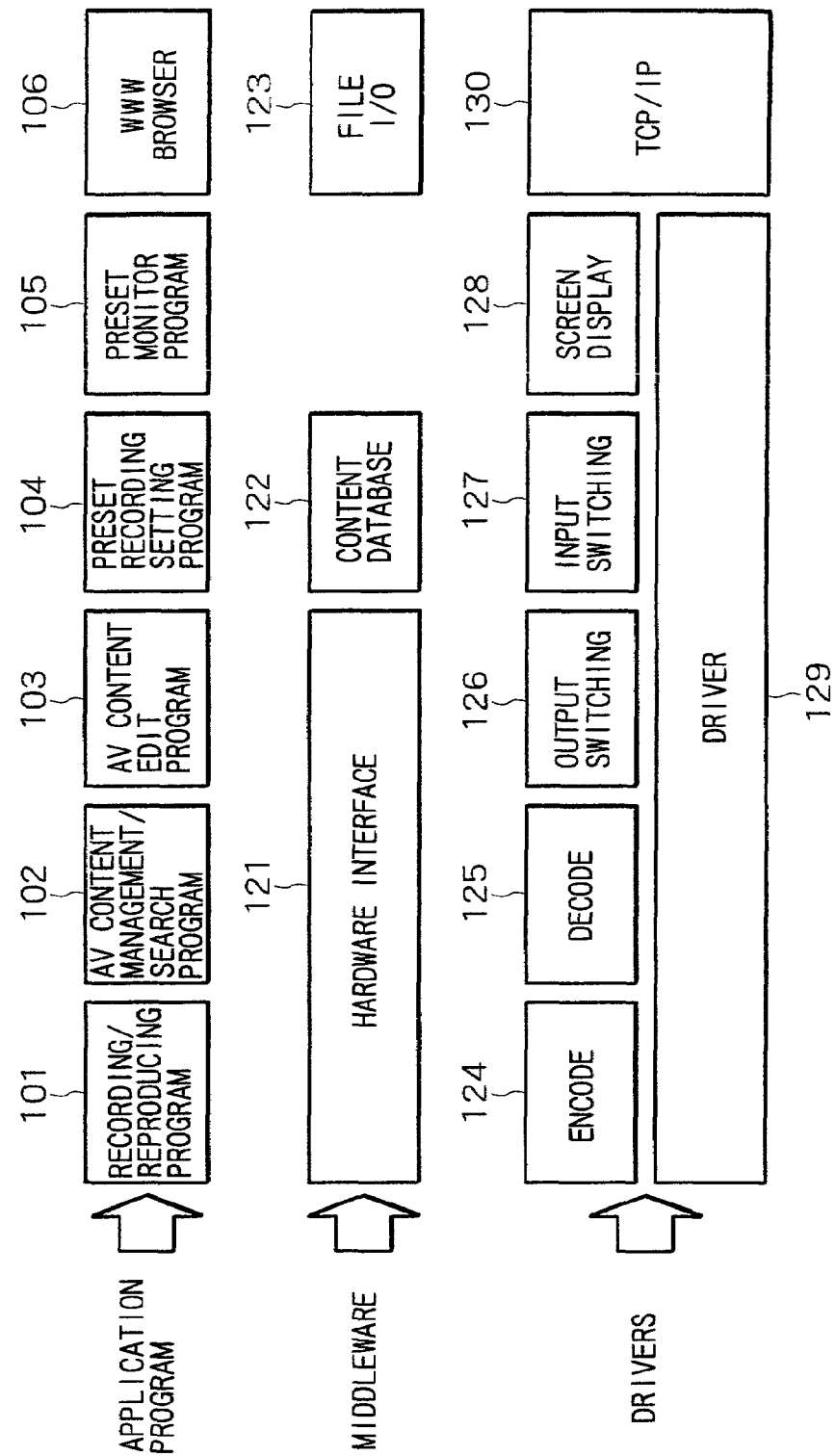
FIG. 6 illustrates the relationships between the application programs to be executed by the personal computer 1, middleware, and drivers.

Referring to FIG. 6, there is shown a relationship between the application programs to be executed by the personal computer 1, middleware, and drivers. The middleware operates predetermined drivers in response to the requests from the application programs. The drivers actually operate predetermined hardware resources such as the MPEG encoder 58 of the image processing board 34.

A hardware interface 121 arbitrates the requests issued from the recording/reproducing program 101, the AV content management search program 102, the AV content edit program 103, the preset-recording setting program 104, the preset-recording monitor program 105, and the WWW browser 106 so that these application programs can properly use the predetermined hardware resources on the basis of various settings such as priorities.

A content database 122 manages data such as AV content attributes to be described later and provides the AV content attribute data or the data for identifying a file containing the image or audio digital data corresponding to AV content to the recording/reproducing program 101, the AV content management search program 102, the AV content edit program 103, the preset-recording setting program 104, and the preset-recording monitor program 105.

A file I/O (Input/Output) 123 actually executes data read and write operations on a predetermined file in response to data read and write requests for predetermined AV content (constituted by one or more files) issued from the recording/reproducing program 101, the AV content management search program 102, the AV content edit program 103, the preset-recording setting program 104, and the preset-recording monitor program 105.

An Encoder 124 controls the MPEG encoder 58 of the image processing board 34 to compress the image or audio data inputted from the digital selector 57 into MPEG digital data.

A decoder 125 controls the MPEG decoder 60 of the image processing board 34 to decompress the MPEG image or audio digital data inputted from the bridge 59.

An output switch 126 operates the analog selector 55 and the 1394 interface 51 of the image processing board 34 to control the analog signal from the image processing board 34 or the output of the digital data via the bus network 5.

An input switch 127 operates the analog selector 55, the 1394 interface 51, the DV data interface 52, and the digital selector 57 of the image processing board 34 to select the analog signal or digital data to be inputted in the image processing board.

An image display 128 operates the digital selector 57 and the bridge 59 to control the display of images onto the CRT 30.

A driver 129 is a program for actually operating the image processing board 34 in response to the requests from the encoder 124, the decoder 125, the output switch 126, the input switch 127, and the image display 128.

A TCP/IP (Transmission Control Protocol/Internet Protocol) 130 executes the processing for connecting the communication board 35 to the network 6.

In what follows, the description of the processing associated with audio signals will be omitted for simplicity.

Figure 7:
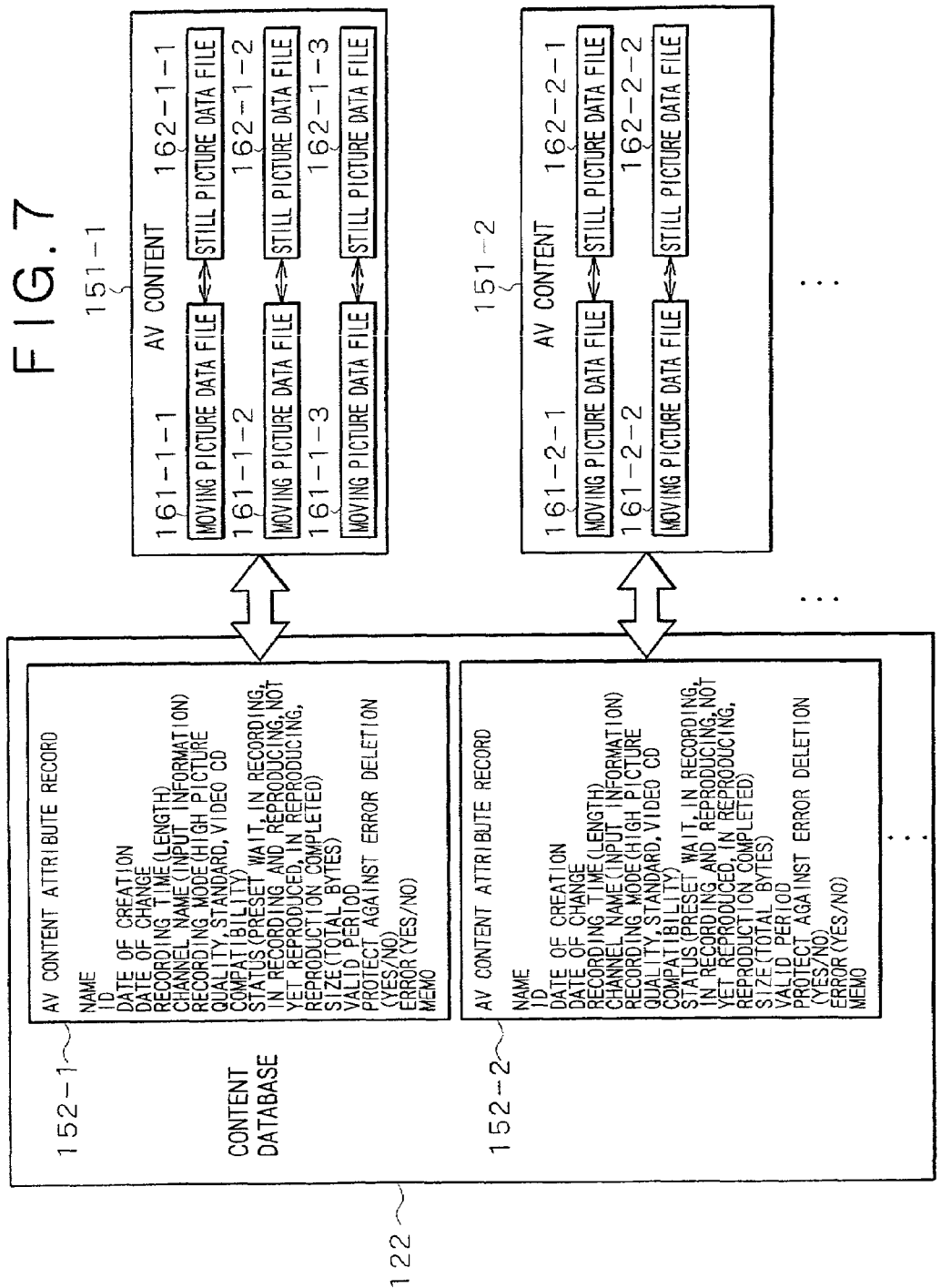
FIG. 7 illustrates an exemplary configuration of AV content.

Referring to FIG. 7, there is shown an exemplary configuration of AV content. The content database 122 recorded on the HDD 31 stores the attributes of each AV content. An AV content attribute record 152-1 recorded in the content database 122 stores such attributes of AV content 151-1 as name, ID (Identification Data), date of creation, date of change, recording time, channel name, recording mode, status, valid period (defined by date and time), error delete prevention, error presence/absence, two-dimensional bar code, and memo. An AV content attribute record 152-2 recorded in the content database 122 stores such attributes of AV content 151-2 as name, ID (Identification Data), date of creation, date of change, recording time, channel name, recording mode, status, valid period, error delete prevention, error presence/absence, two-dimensional bar code, and memo.

The data of the recording mode stored in the AV content attribute record 152-1 indicates to which of the recording modes, high quality, standard, or video CD compatible (indicative that the image data has MPEG1 format) moving image data files 161-1-1 through 161-1-3 are set. Likewise, the status data stored in the AV content attribute record 152-1 indicates which of the states, wait for presetting, in recording, in recording/reproducing (image data is recorded and then the recorded image data is being reproduced), not yet reproduced, in reproducing, and reproduction completed, the AV content 151-1 is in.

The error indicates a status of the AV content 151-1 such as the AV content has been recorded only halfway due to a fault of the personal computer 1 during recording, the image could not be reproduced by the signal inputted from the antenna 2 due to the poor signal receiving state during recording, or the moving image data file 161-1-1 is partially missing, for example.

The settings of valid period and error delete prevention are not set at the same time; namely, neither of them is set or only one of them is set.

The data of the recording mode stored in the AV content attribute record 152-2 indicates to which of the recording modes, high quality, standard, or video CD compatible, moving image data files 161-2-1 through 161-2-3 are set. Likewise, the status data stored in the AV content attribute record 152-2 indicates which of the states, wait for presetting, in recording, in recording/reproducing, not yet reproduced, in reproducing, and reproduction completed, the AV content 151-2 is in.

The AV content 151-1 is constituted by the moving image data files 161-1-1 through 161-1-3 and the still image files 162-1-1 through 162-1-3 recorded in the HDD 31. The moving image data files 161-1-1 through 161-1-3 store the image data of MPEG format. The image corresponding to the image data stored at the beginning of the moving image data file 161-1-2 continues to the image data stored at the end of the moving image data file 161-1-1. Likewise, the image corresponding to the image data stored at the beginning of the moving image data file 161-1-3 continues to the image corresponding to the image data stored at the end of the moving image data file 161-1-2.

The still image data file 162-1-1 stores the image data obtained by converting a image data scene switching image stored in the moving image data file 161-1-1 into a still image and the corresponding scene switching time data. The still image data file 162-1-2 stores the image data obtained by converting a image data scene switching image stored in the moving image data file 161-1-2 into a still image and the corresponding scene switching time data. The still image data file 162-1-3 stores the image data obtained by converting a image data scene switching image stored in the moving image data file 161-1-3 into a still image and the corresponding scene switching time data.

The AV content 151-2 is constituted by the moving image data files 161-2-1 and 161-2-2 and the still image data files 162-2-1 and 162-2-2 and has the same configuration as that of the AV content 151-1, so that the description of the AV content 151-2 is omitted.

Hereafter, the AV content 151-1 and the AV content 151-2 will be generically referred to as AV content 151 unless the distinction between them is required. The AV content attribute record 152-1 and the AV content attribute record 152-2 will be generically referred to as an AV content attribute record 152 unless the distinction between them is required. The moving image data files 161-1-1 through 161-1-3 and the moving image data files 161-2-1 through 161-2-2 will be generically referred to as a moving image data file 161 unless the distinction between them is required. The still image data files 162-1-1 through 162-1-3 and the still image data files 162-2-1 and 162-2-2 will be generically referred to as a still image data file 162 unless the distinction between them is required.

Figure 8:
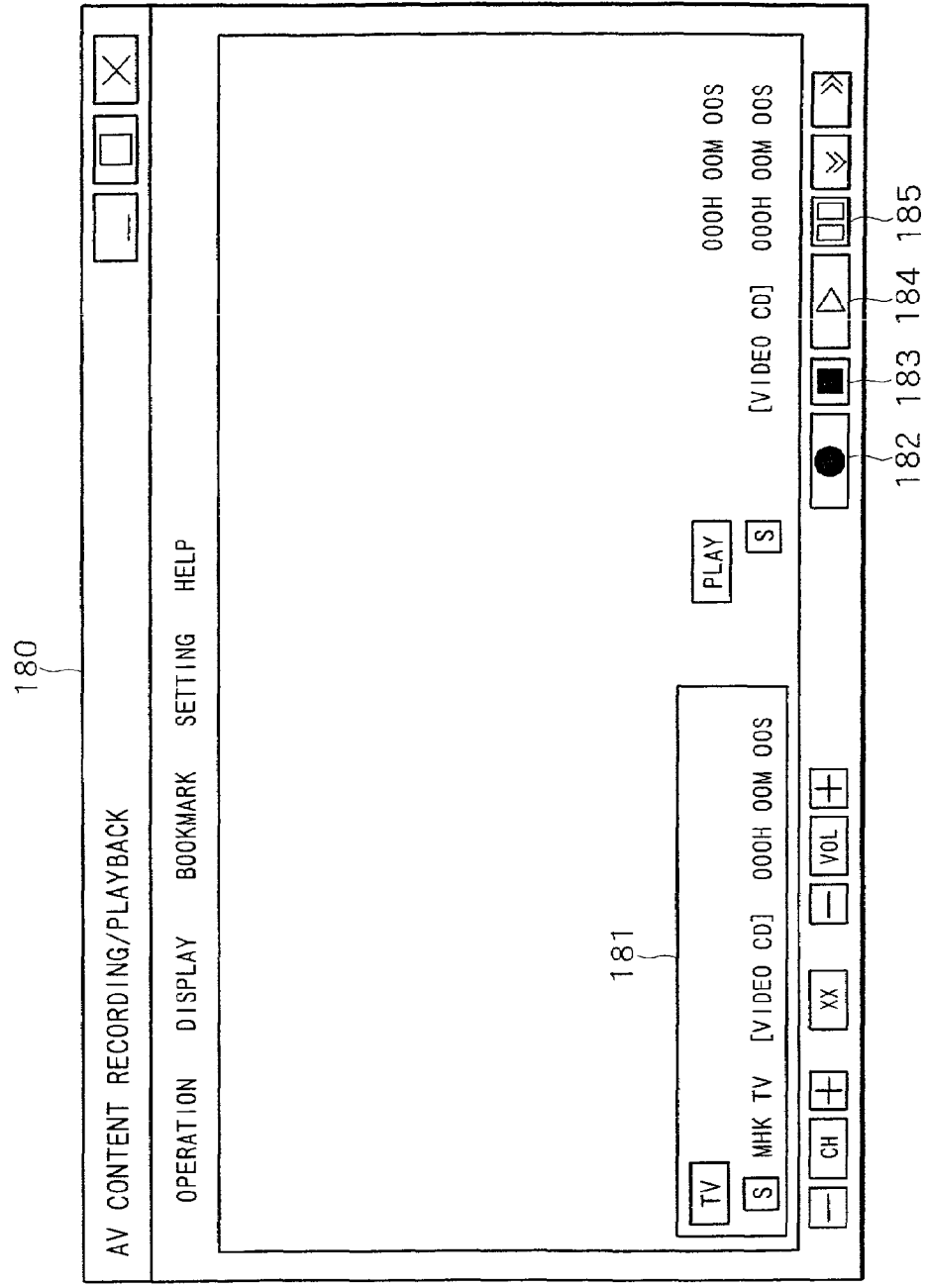
FIG. 8 illustrates an exemplary display screen of an AV content recording/reproducing window 180 displayed by a recording/reproducing program 101.
Figure 9:
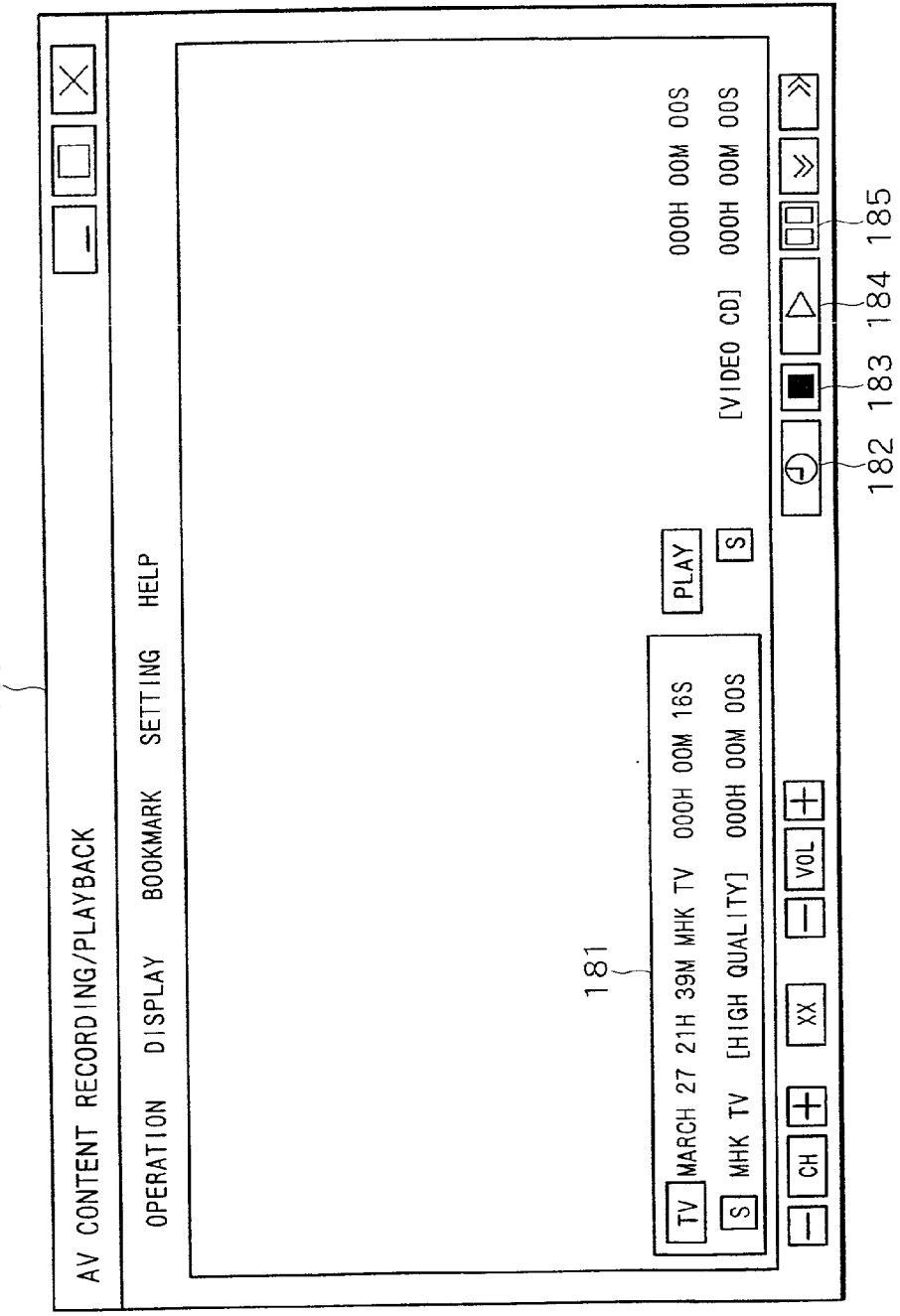
FIG. 9 illustrates another exemplary display screen of the AV content recording/reproducing window 180 displayed by the recording/reproducing program 101.

The following describes an AV content recording/reproducing window to be displayed by the recording/reproducing program 101 onto the CRT 30 of the personal computer 1 with reference to FIGS. 8 and 9. FIG. 8 shows an exemplary display screen of an AV content recording/reproducing window 180 to be displayed on the CRT 30 of the personal computer 1.

A recording window 181 shows the settings such as the channel to be recorded and the recording mode. When recording starts, the recording/reproducing program 101 sets the operation of the tuner 54 or the MPEG encoder 58 of the image processing board 34 on the basis of the settings made through the recording window 181, generates the predetermined AV content 151 and the AV content attribute record 152, and stores them in the HDD 31.

When the recording window 181 is selected and active, a record button 182 and a stop button 183 become active and ready for operation. Namely, when the recording window 181 is selected and active, the recording/reproducing program 101 starts recording when the record button 182 is clicked and stops recording when the stop button is clicked.

On the other hand, when the recording window 181 is selected and active, a reproduce button 184 and a pause button 185 become inactive. Therefore, when the reproduce button 184 or the pause button 185 is clicked, the recording/reproducing program does not operate.

FIG. 9 shows an exemplary display screen of the AV content recording/reproducing window 180 to be displayed on the CRT 30 of the personal computer when the recording/reproducing program 101 starts recording. The recording window 181 displays the elapsed time from the start of recording and the current time in addition to the channel to be recorded and the recording mode.

When recording starts, the record button 182 becomes a recording time change button 191. The recording time is changed every time the recording time change button 191 is clicked.

Figure 10:
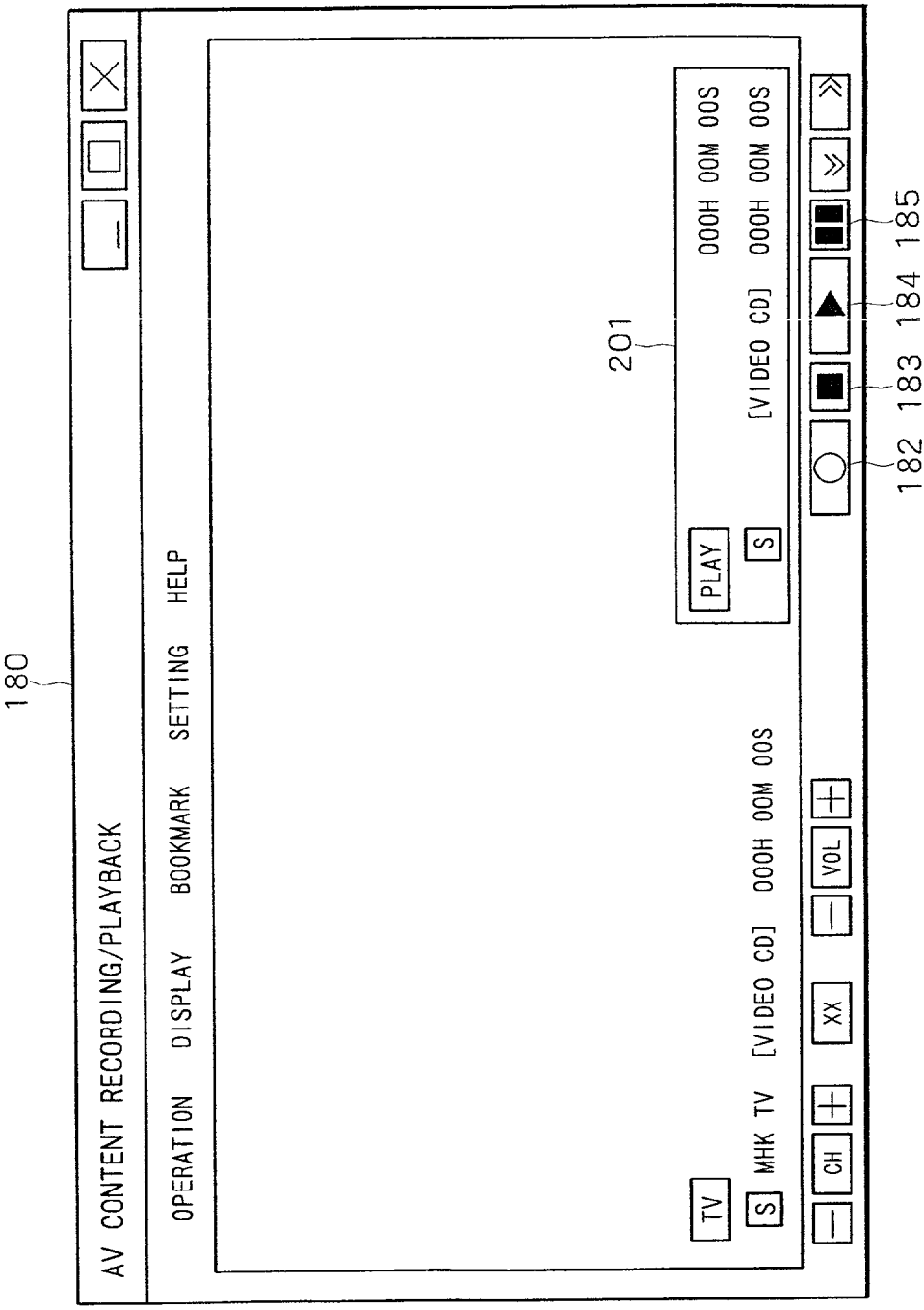
FIG. 10 illustrates still another exemplary display screen of the AV content recording/reproducing window 180 displayed by the recording/reproducing program 101.

The following describes a display screen for reproducing the predetermined AV content 151 by the recording/reproducing program 101 with reference to FIG. 10. FIG. 10 shows an exemplary display screen of the AV content recording/reproducing window 180 to be displayed on the CRT 30 of the personal computer 1 when the recording/reproducing program 101 is enabled for a reproducing operation.

A reproducing window 201 displays the recording mode and so on of the AV content to be reproduced. When the reproducing window 201 is selected and active, the stop button 183, the reproduce button 184, and the pause button 185 become active and ready for operation. Namely, when the reproducing window 201 is selected and active, the recording/reproducing program 101 starts reproduction upon clicking of the reproduce button 184, pauses the recording upon clicking of the pause button 185, and stops recording upon clicking of the stop button 183.

On the other hand, when the reproducing window 201 is selected and active, the record button 182 becomes inactive. Therefore, when the record button 182 is clicked, the recording/reproducing program 101 does not operate.

Thus, when the recording/reproducing program 101 activates or deactivates the record button 182, the stop button 183, the reproduce button 184, or the pause button 185 in response to the selection of the recording window 181 or the reproducing window 201, the user can surely know the details of the operation, thereby promptly performing the operation and preventing an erroneous operation from happening.

Figure 12:
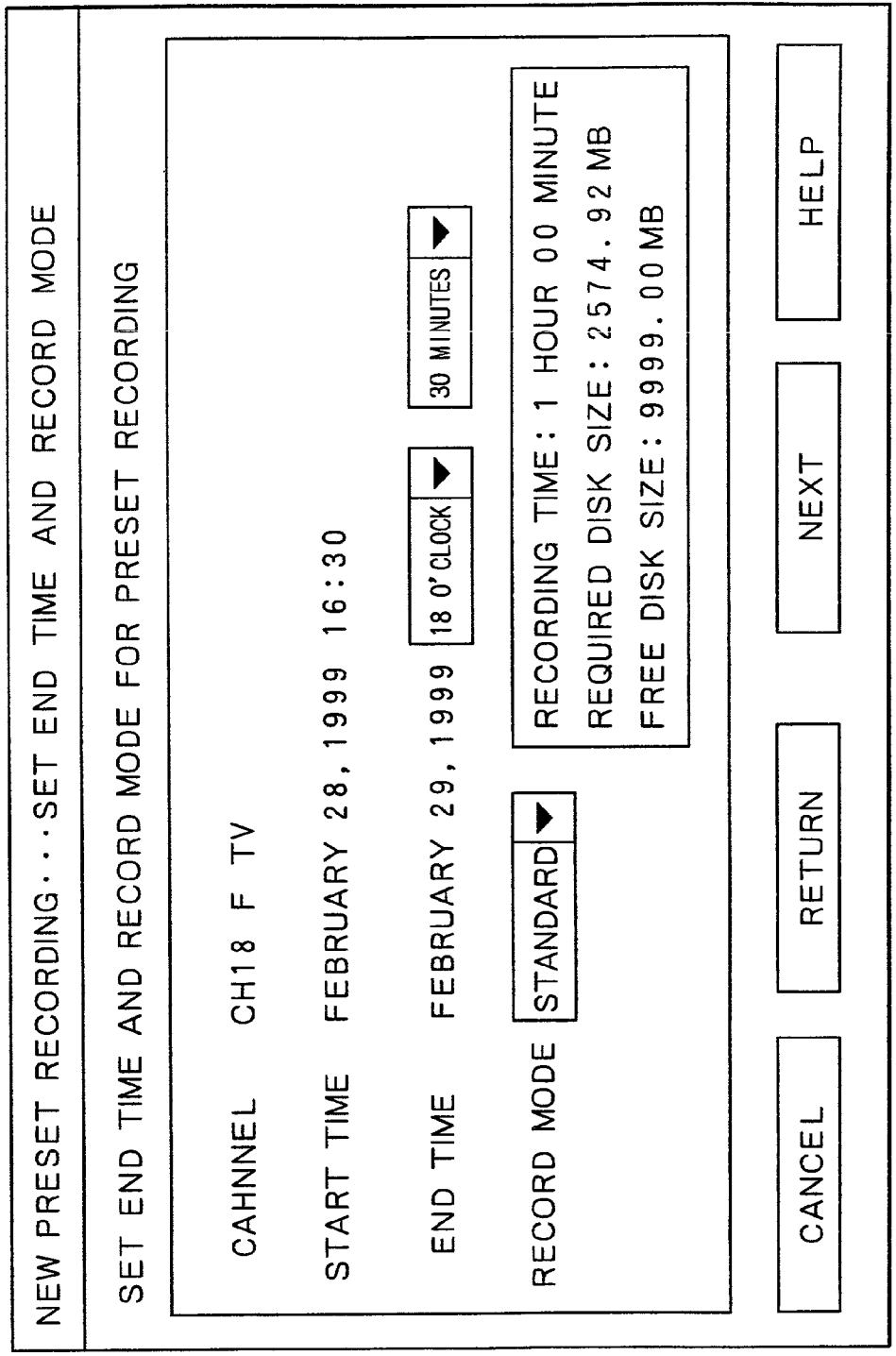
FIG. 12 illustrates another exemplary display screen displayed by the preset-recording setting program 104.

The following describes the presetting of recording. FIGS. 11 through 13 illustrate exemplary display screens of a new preset recording window to be displayed on the CRT 30. When the preset-recording setting program 104 starts, the preset-recording setting program 104 first displays a window for setting the channel to be recorded and the recording start and date and time a shown in FIG. 11. The user sets the channel to be recorded and the recording date and time to the corresponding fields (in the example shown, hour and minute are entered in different fields).

After setting the channel to be recorded and the recording date and time, clicking a predetermined button (in the example shown, "NEXT" button) causes the preset-recording setting program 104 to read the channel to be recorded and the recording start date and time and replaces the current window by a window for setting end time and recording mode shown in FIG. 12.

The preset-recording setting program 104 displays the channel to be recorded and the recording start date and time data in the window for setting end time and recording mode and displays the fields to which the end time (in this example, hour and minute are set to different fields) and the recording mode are set.

When the end time and the recording have been set to this window, the preset-recording setting program 104 displays the data which provides setting guidelines such as recording time and HDD 31 free space. When the end time and the recording mode has been set and a predetermined button ("NEXT" button) is clicked, the preset-recording setting program 104 reads the end time and the recording mode set to the corresponding fields and replaces the current window by a window for confirming the settings shown in FIG. 13.

The preset-recording setting program 104 displays the channel to be recorded, the recording start date and time, the recording end date and time, and the recording mode which have been set above to the window for confirming the settings. When a predetermine button ("COMPLETE" button) is clicked, the preset-recording setting program 104 records the AV content 151 for preset recording to the HDD 31 and registers the AV content attribute record 152 corresponding to the recorded AV content 151 with the content database 122.

The AV content 151 for preset recording has a moving image data file 161 having a recording area corresponding to the recording time and the recording mode. For example, if the image data amount per second in the standard mode is 5 Mbits, the preset recording setting program 104 programmed to perform recording for 4 hours in the standard mode generates one or more moving image data files 161 having a total of 9 GB of storage area on the HDD 31 as will be obtained from the following equation because 4 hours are equal to 14400 seconds:

14400 seconds×(5 Mbits/second)/(8 bits/byte)=9GB.

The following describes an operation for generating the AV content 151 for preset recording on the basis of predetermined preset recording data downloaded from the server 7 by the preset-recording setting program 104. When the user starts the WWW browser 106, the personal computer 1 displays a predetermined screen on the basis of a predetermined file written in HTML (Hyper Text Markup Language) provided from the server 7 via the network 6.

Referring to FIG. 14, there is shown an exemplary display screen of a program guide to be displayed on the CRT 30 by the personal computer 1 operating the WWW browser 106 on the basis of the predetermined file provided from the server 7. A program guide 250 has predetermined preset-recording data download buttons 251-1 through 251-11 corresponding to the programs in this program guide.

For example, when the preset-recording data download button 251-1 is clicked, the preset-recording data for preset-recording "7 P.M. News" of MHK General is downloaded to the personal computer 1. When the preset-recording data download button 251-2 is clicked, the preset-recording data for preset-recording "TV Map" of MHK General is downloaded to the personal computer 1. When the preset-recording data download button 251-3 is clicked, the preset-recording data for preset-recording "Drama" of MHK General is downloaded to the personal computer 1. When the preset-recording data download button 251-4 is clicked, the preset-recording data for preset-recording "Local Weather" of MHK General is downloaded to the personal computer 1.

When the preset-recording data download button 251-5 is clicked, the preset-recording data for preset-recording "After-school Club" of MHK Educational is downloaded to the personal computer 1. When the preset-recording data download button 251-6 is clicked, the preset-recording data for preset-recording "Sign Language Corner" of MHK Educational is downloaded to the personal computer 1. When the preset-recording data download button 251-7 is clicked, the preset-recording data for preset-recording "Tomorrow's Health" of MHK Educational is downloaded to the personal computer 1.

When the preset-recording data download button 251-8 is clicked, the preset-recording data for preset-recording "With You Tonight" of MHK Educational is downloaded to the personal computer 1. When the preset-recording data download button 251-9 is clicked, the preset-recording data for preset-recording "Let's Learn Braille" of MHK Educational is downloaded to the personal computer 1.

When the preset-recording data download button 251-10 is clicked, the preset-recording data for preset-recording "Professional Baseball" of Dai Nippon Television is downloaded to the personal computer 1. When the preset-recording data download button 251-11 is clicked, the preset-recording data for preset-recording "The Sun of Friday TV 1" of YBS is downloaded to the personal computer 1.

Because each preset-recording data includes the data necessary for the preset recording described with reference to FIGS. 11 through 13 except for the recording mode, presetting the recording mode allows the personal computer 1 to record the AV content 151 for preset recording to the HDD 31 by use of the preset recording data downloaded by clicking any of the preset-recording data download buttons 251-1 through 251-11 without the setting by the user.

Referring to FIG. 15, there is shown an example of the preset-recording data. Each preset recording data is made up of text data. "Content_type: application/x-tv-program-info; charset=shift_jis" on the first lien of the preset-recording data indicates that this data is preset-recording data. On the third line of the preset-recording data, "station:" is followed by the data for identifying the channel to be recorded. For example, in "station: Dai Nippon Television" in FIG. 15, the data for identifying the channel to be recorded is "Dai Nippon Television."

For the data for identifying the channel to be recorded, an ambiguous description in a predetermined range is permitted. This data is converted by a process using a channel conversion file shown in FIG. 16 into data for identifying a predetermined channel (a television station).

In character strings "14, 0, 0, 14, Dai Nippon Television, Dai Nippon Television, Dai Nichi TV, Dai Nippon Television Network, DTV" for example in the channel conversion file, the first "14" is the data for identifying the channel, the second "14" is the data for channel display, and the first "Dai Nippon Television" is the data for channel name display. The subsequent character string "Dai Nippon Television, Dai Nichi TV, Dai Nippon Television Network, DTV" are used to take matching with a predetermined character string of the channel conversion file.

For example, if "station: Dai Nippon Television" is written on the third line of the preset-recording data, the preset-recording setting program 104 determines whether the character string "Dai Nippon Television" after "station:" matches the character string located to the right of the fifth comma from the beginning of the channel conversion file.

As shown in the example of FIG. 16, if the character string "14, 0, 0, 14, Dai Nippon Television, Dai Nippon Television, Dai Nichi TV, Dai Nippon Television Network, DTV" is included in the channel conversion file, the preset-recording setting program 104 determines that character string "Dai Nippon Television" (to the right of the fifth command from the beginning) matches the character string in the channel conversion file.

When there is a match between the character string of the preset-recording data and the character string of the channel conversion file, the preset-recording setting program 104 sets, as the channel, the data for identifying a channel on the same row of the matching channel conversion file.

For example, if the character string "14, 0, 0, 14, Dai Nippon Television, Dai Nippon Television, Dai Nichi TV, Dai Nippon Television Network, DTV" matches the character string of the preset-recording data, the channel is set to 14.

Therefore, if the character string for identifying the channel of the preset-recording data is any one of "Dai Nippon Television, Dai Nichi TV, Dai Nippon Television Network, DTV" for example, the preset-recording setting program 104 can set the channel to 14 on the basis of the preset-recording data.

Thus, if the character string for specifying the channel of the preset-recording data is ambiguous to some extent, the preset-recording setting program 104 can set the preset recording to a predetermined channel on the basis of the preset-recording data.

Likewise, the data for identifying the date and time at which recording starts is written to the fourth through seventh lines of the preset-recording data and the data for identifying the time at which the recording is ended is written to the eighth lien.

Because the preset-recording data is constituted by character string data, the user of the personal computer 1 can easily create the preset-recording data by a general-purpose application program such as a word processor or a text editor for example.

Figure 17:
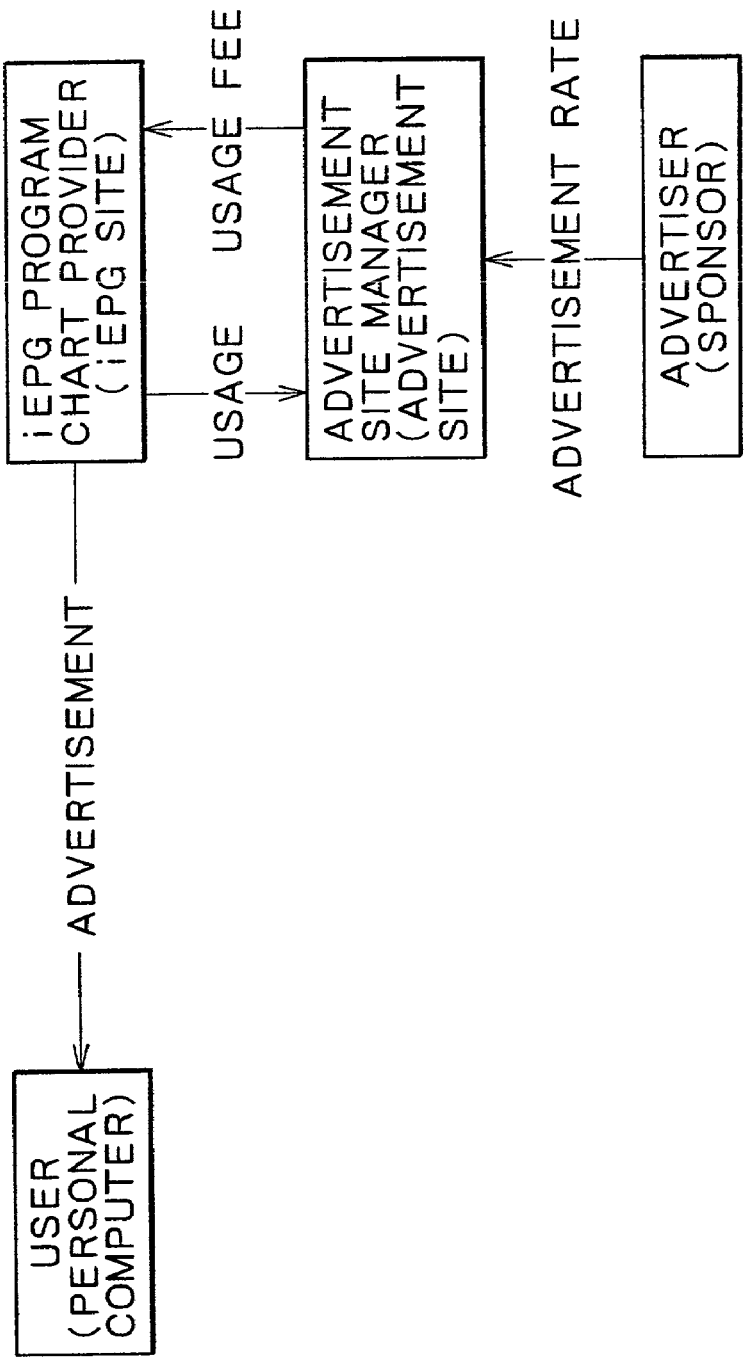
FIG. 17 illustrates the relationships between the user of the personal computer 1, the iEPG program guide provider running an iEPG site, the advertisement site operator running an advertisement site 8, and an advertisement sponsor.

The following describes the relationships between the user who causes the personal computer 1 to record a television program and reproduce it for viewing, the iEPG program guide provider who is running the iEPG site, the advertisement site operator who is running the advertisement site 8, and the advertisement sponsor with reference to FIG. 17.

Accessing the iEPG site, the user of the personal computer 1 can acquire the preset-recording data free of charge. However, in return for the free preset-recording data, the user is forced to view an advertisement in viewing the television program recorded by use of the preset-recording data.

The iEPG program guide provider who operates the iEPG site 7 can receive from the advertisement site operator a fee for the transmission of the advertisement data managed by the advertisement site 8 to the personal computer 1 along with the preset-recording data.

The advertisement site operator who is running the advertisement site 8 sells the advertisement frame of each program listed in the program guide to corporations for example and collects advertisement rates from the sponsors in behalf of the iEPG program guide provider who operates the iEPG site 7, thereby executing a so-called advertisement agency operation.

Each sponsor accesses the advertisement site 8 to purchase a desired advertisement frame in the program guide, pays the advertisement rate to the advertisement site operator, and supplies the advertisement-associated data to the advertisement server 8.

Figure 18:
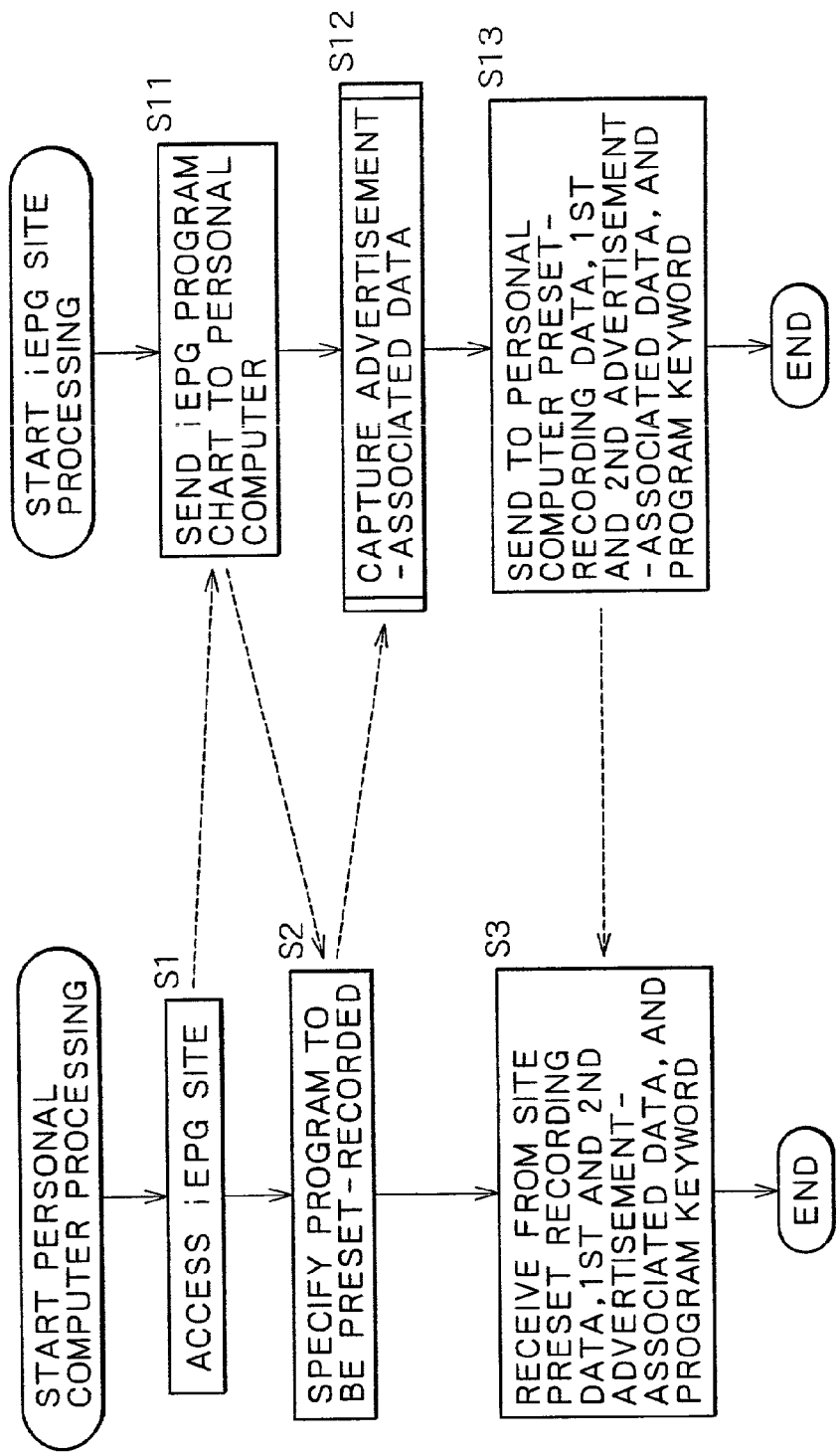
FIG. 18 is a flowchart describing a first exemplary operation of the image recording/reproducing system to be executed when the personal computer 1 acquires preset-recording data from the iEPG site 7.

The following describes a first operation example of the image recording/reproducing system to be performed when the personal computer 1 acquires the preset-recording data from the iEPG site 7 with reference to the flowchart shown in FIG. 18.

In step S1, the WWW browser 106 started in the personal computer 1 accesses the iEPG site via the network 6 as specified by the user. In response to this access, the iEPG site 7 transmits television program guide data to the personal computer 1 via the network 6 as Web content in step S11.

In step S2, the WWW browser 106 receives the program guide data from the iEPG site 7 and displays a program guide

250 as shown in FIG. 14 on the CRT 30. When the user specifies a program to be recorded by clicking a preset-recording data download button 251 in the displayed program guide 250, the WWW browser transmits the information for identifying the specified program to the iEPG site 7 via the network 6. In step S12, in response to the program identifying information received from the personal computer 1, the iEPG site 7 executes advertisement-associated data acquisition processing.

Figure 19:
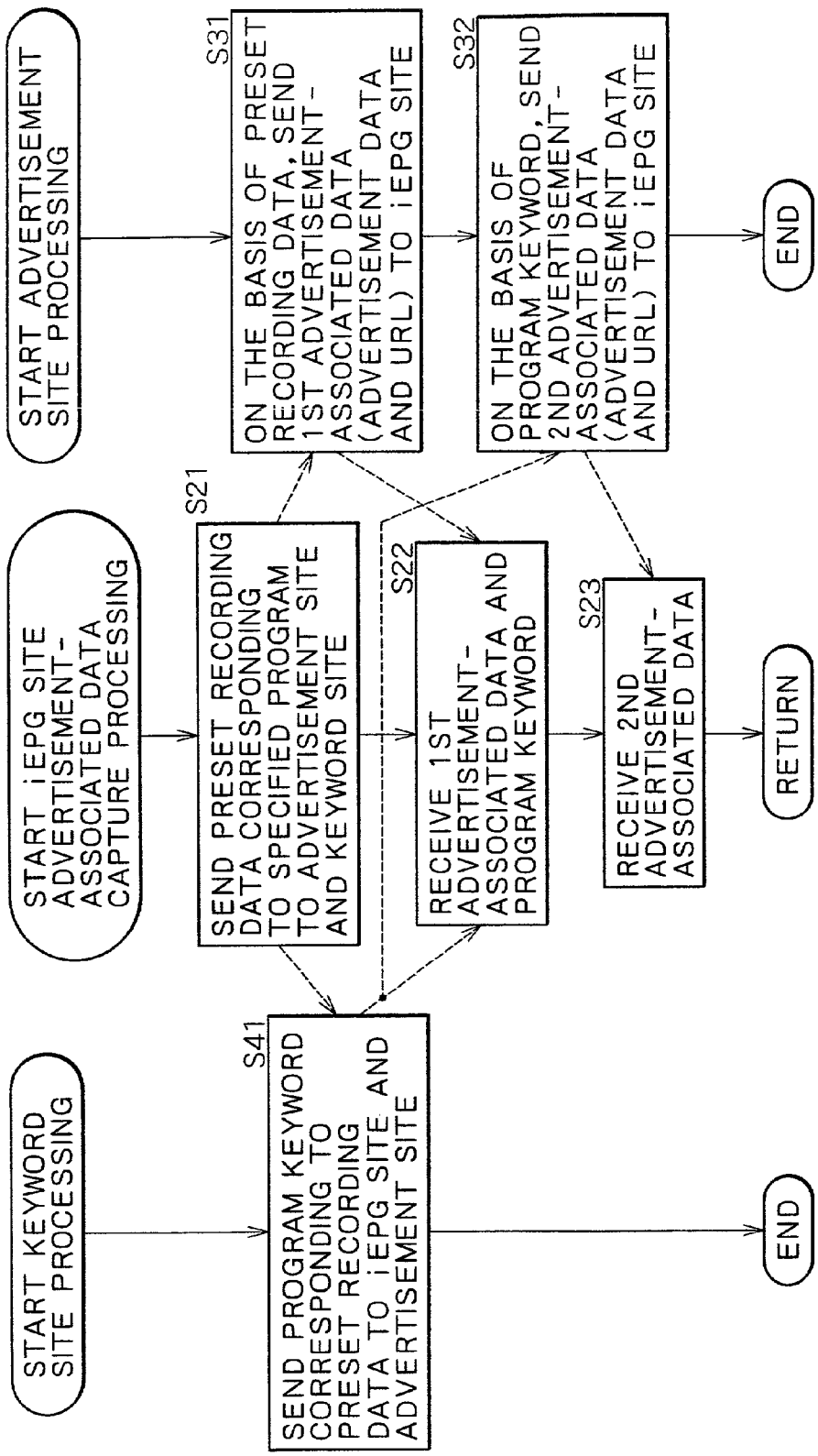
FIG. 19 is a flowchart describing the details of advertisement-associated data acquisition processing of step S12 in FIG. 18.

The following describes the details of the advertisement-associated data acquisition processing with reference to the flowchart shown in FIG. 19.

In step S21, the iEPG site 7 generates the preset-recording data corresponding to the program specified by the personal computer 1 and transmits the recording date and channel data among the generated preset-recording data to the advertisement site 8 and a keyword site.

The keyword site herein denotes is a site on the network 6 which identifies a program to be recorded on the basis of the recording date and channel data received from the iEPG site 7 and transmits a program keyword (to be described with reference to FIG. 21) recorded as related to the identified program to the iEPG site and the advertisement site 8. It should be noted that the keyword site may be set up by the server 7 along with the iEPG site or by the server 8 along with the advertisement site or by another server on the network 6.

In step S31, the advertisement site 8 matches the recording date and channel data received from the iEPG site 7 against a table listing the relationship between recording date, channel, and advertisement managed by the advertisement site 8 as shown in FIG. 20 to identify the advertisement-associated data supplied by a sponsor who purchased the corresponding advertisement frame (the advertisement-associated data being an animation GIF file and the URL of Web site of the sponsor) and transmits the identified advertisement data to the iEPG site 7 as the first advertisement-associated data.

For example, is the recording date and channel data supplied from the iEPG site 7 indicates "from 8:30 to 10:20 of month XX day XX, channel 14," then a robot commercial animation GIF file (http://www.sdenki.co.jp/~CM/robot.gif) sponsored by S Electric Corporation and a URL character string A"http://www.sdenki.co.jp" are transmitted to the iEPG site 7.

On the other hand, in step S41, the keyword site matches the recording date and channel data received from the iEPG site 7 against a table listing the relationship between recording date, channel, and program keyword managed by itself as shown in FIG. 21 to identify the program to be recorded and transmits the program keyword recorded as related with the identified program to the iEPG site 7 and the advertisement site 8.

For example, if the recording date and channel data received from the iEPG site 7 indicates "from 8:30 to 10:20 of month XX day XX, channel 14," then the program to be recorded is "All About S Electric Corporation" and the program keyword "Documentary, S Electric Company, Deguchi Nobuyuki, Running Man, WAIO, Kaibo, TeraPocket, WEGA, Playstand" recorded as related thereto is transmitted to the iEPG site 7 and the advertisement site 8.

In step S22, the iEPG site 7 receives the first advertisement-associated data from the advertisement site 8 and the program keyword from the keyword site.

In step S32, the advertisement site 8 matches the program keyword received from the keyword site against a table listing relationship between program keyword and advertisement managed by itself as shown in FIG. 22 and transmits the corresponding advertisement-associated data (an animation GIF file and the URL of the Web site operated by the sponsor) to the iEPG site 7 as the second advertisement-associated data. If there are two or more advertisement-associated data corresponding to the program keyword supplied from the keyword site, the advertisement-associated information transmitted to the iEPG site 7 least often is preferentially transmitted to the iEPG site 7.

In step S23, the iEPG site 7 receives the second advertisement-associated data from the advertisement site 8.

By executing the above-mentioned advertisement-associated data acquisition processing, the iEPG site 7 generates the preset-recording data corresponding to the program specified by the user of the personal computer 1, acquires the first and second advertisement-associated dada from the advertisement site 8, and acquires the program keyword from the keyword site.

Referring to FIG. 18 again, in step S13, the iEPG site 7 transmits the preset-recording data corresponding to the program specified by the user of the personal computer 1, the first and second advertisement-associated data, and the program keyword to the personal computer 1 via the network 6.

In step S3, the WWW browser 106 of the personal computer 1 receives the preset-recording data, the first and second advertisement-associated data, and the program keyword supplied from the iEPG site 7 and records (downloads) them into the HDD 31.

Subsequently, the preset-recording data is supplied to the preset-recording setting program 104 to be used for setting preset-recording. It should be noted that the relationship between the AV content 151 generated by the preset-recording executed in accordance with the settings based on the preset-recording data, the first and second advertisement-associated data, and the program keyword is recorded as a text file at a predetermined location in the HDD 31.

Figure 23:
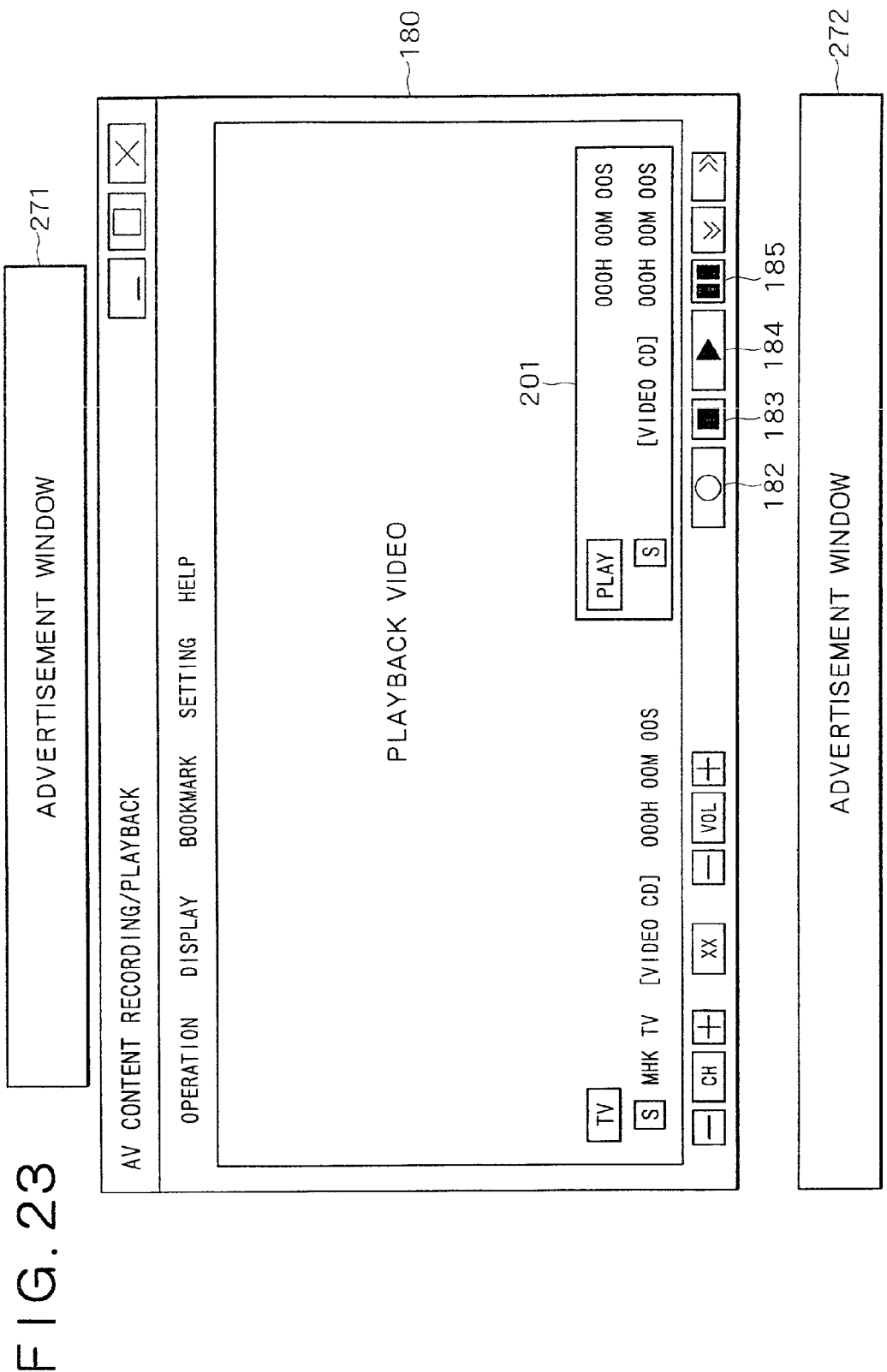
FIG. 23 illustrates an exemplary display screen an advertisement in the first exemplary operation of the image recording/reproducing system.

FIG. 23 shows an exemplary display screen on the CRT 30 displayed when the AV content 151 generated by the preset-recording executed in accordance with the preset-recording data is reproduced by the recording/reproducing program 101. In this case, as shown in the figure, advertisement windows 271 and 272 are opened beside the AV content recording/reproducing window 180 in which a video reproduced by the recording/reproducing program 101.

The advertisement window 271 displays an image corresponding to the animation GIF file included in the first advertisement-associated data corresponding to the AV content 151 being reproduced. It should be noted that the advertisement window 271 is linked to the URL included in the first advertisement-associated data and, when the advertisement window 271 is clicked, the WWW browser 106 is started, starting the access to the URL included in the first advertisement-associated data.

The advertisement window 272 displays an image corresponding to the animation GIF file included in the second advertisement-associated data corresponding to the AV content 151 being reproduced. It should be noted that the advertisement window 272 is linked to the URL included in the second advertisement-associated data and, when the advertisement window 272 is clicked, the WWW browser 106 is started, starting the access to the URL included in the second advertisement-associated data.

It should be noted that, as long as the image of he AV content 151 being reproduced is displayed in the AV content recording/reproducing window 180, the advertisement windows 271 and 272 cannot be closed. Therefore, when the user of the personal computer 1 views the AV content 151 generated by the preset recording executed in accordance with the settings based on the preset-recording data, he also views the advertisement displayed at the same time.

Also, it should be noted that the advertisement windows 271 and 272 may be opened when the AV content recording/reproducing window 180 is closed to display the image corresponding to the animation GIF file included in the first and second advertisement-associated data.

Figure 24:
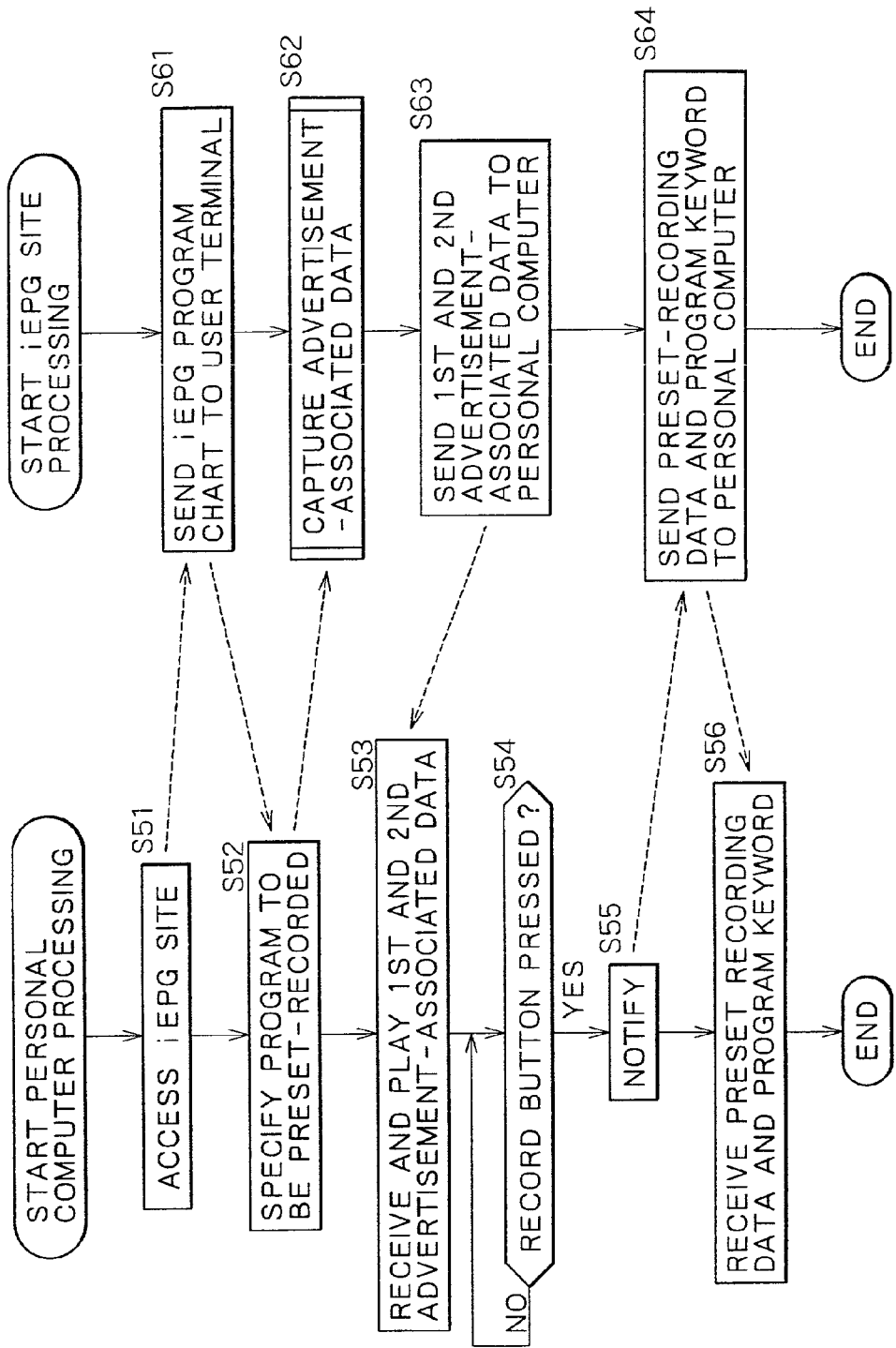
FIG. 24 is a flowchart describing a second exemplary operation of the image recording/reproducing system to be performed when the personal computer 1 acquires preset-recording data from the iEPG site.

The following describes a second operation example of the image recording/reproducing system to be executed when the personal computer 1 acquires preset-recording data from the iEPG site 7 with reference to the flowchart shown in FIG. 24.

In step S51, the WWW browser 106 started in the personal computer 1 accesses the iEPG site via the network 6 as instructed by the user. In response to this access, the iEPG site 7 transmits television program guide data to the personal computer 1 via the network 6 as Web content in step S61.

In step S52, the WWW browser 106 receives the program guide data from the iEPG site 7 and displays the program guide 250 shown in FIG. 14 onto the CRT 30. When the user specifies a program to be preset-recorded by clicking the preset-recording data download button 251 in the displayed program guide 250, the WWW browser 106 transmits the information for identifying the specified program to the iEPG site 7 via the network 6. In response to the information for identifying the specified program from the personal computer 1, the iEPG site 7 executes advertisement-associated data acquisition processing in step S62.

The advertisement-associated data acquisition processing by the iEPG site 7 in step S62 is the same as that in step S12 and therefore its description is skipped.

By executing the advertisement-associated data acquisition processing, the iEPG site 7 generates the preset-recording data corresponding to the program specified by the user of the personal computer 1, acquires the first and second advertisement-associated data from the advertisement site 8, and acquires the program key word from the keyword site.

In step S63, the iEPG site 7 transmits the first and second advertisement-associated data corresponding to the preset-recording data corresponding to the program specified by the user of the personal computer 1 to the personal computer 1 via the network 6.

Figure 25:
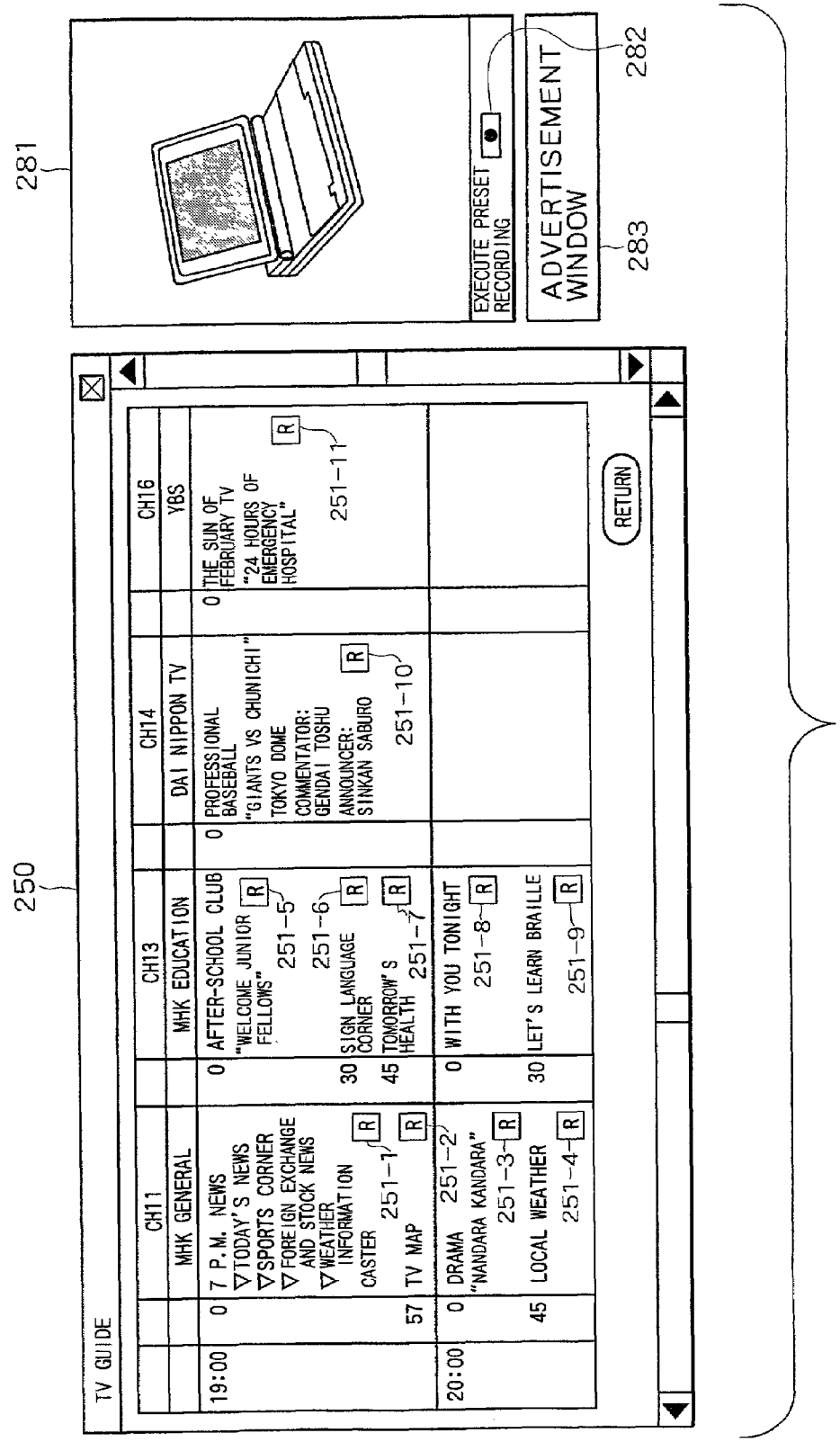
FIG. 25 illustrates an exemplary advertisement display screen in the second exemplary operation of the image recording/reproducing system.

In step S53, the WWW browser 106 of the personal computer 1 receives the first and second advertisement-associated data from the iEPG site 7 and records them into the HDD 31. Further, as shown in FIG. 25, the WWW browser 106 opens advertisement windows 281 and 283 beside the displayed program guide 250, displays an image corresponding to the animation GIF file included in the first advertisement-associated data in the advertisement window 281 and an image corresponding to the animation GIF file included in the second advertisement-associated data in the advertisement window 283. In the advertisement window 281, a preset-recording execute button 282 is arranged. The preset-recording execute button 282 can be clicked when the advertisement animation displayed in the advertisement window 281 has ended or a predetermined time (for example, about 5 to 10 seconds) has passed after the start of the advertisement animation displays.

In step S54, the WWW browser 106 determines whether the preset-recording execute button 282 has been clicked and waits until this button is found clicked. When the preset-recording execute button 282 is found clicked, the procedure goes to step S55. In step S55, the WWW browser 106 notifies the iEPG site 7 of the clicking of the preset-recording execute button 282 via the network 6.

In response to this notification, the iEPG site 7 transmits the preset-recording data generated by the advertisement-associated data acquisition processing and the program keyword supplied from the keyword site to the computer 1 via the network 6 in step S64.

In step S56, the WWW browser 106 of the personal computer 1 receives the preset-recording data and the program keyword from the iEPG site 7 and records (downloads) them into the HDD 31. Subsequently, the preset-recording data is supplied to the preset-recording setting program 104 for use in setting preset-recording. It should be noted that the relationship between the AV content 151 generated by the preset-recording executed in accordance with the settings based on the preset-recording data, the first and second advertisement-associated data received in step S53, and the program keyword received in step S56 is recorded as a text file at a predetermined location in the HDD 31.

If the AV content 151 generated by the preset recording executed in accordance with the settings based on the preset-recording data received by the second operation example is reproduced by the recording/reproducing program 101, the images corresponding to the advertisement data are displayed in the advertisement windows 271 and 272 beside the AV content recording/reproducing window 180 in which the image reproduced by the recording/reproducing program 101 is displayed as shown in FIG. 23 as with the first ff operation example.

Thus, in the second operation example, an advertisement is displayed before the preset-recording data is obtained (downloaded). Further, an advertisement is also displayed when a program recorded on the basis of the obtained preset-recording data is reproduced for viewing.

The following describes the camera-attached digital mobile telephone MS3 practiced as the second embodiment of the information processing apparatus according to the invention will be described, which takes the place of the personal computer 1 in the image recording/reproducing system shown in FIG. 1.

Figure 26:
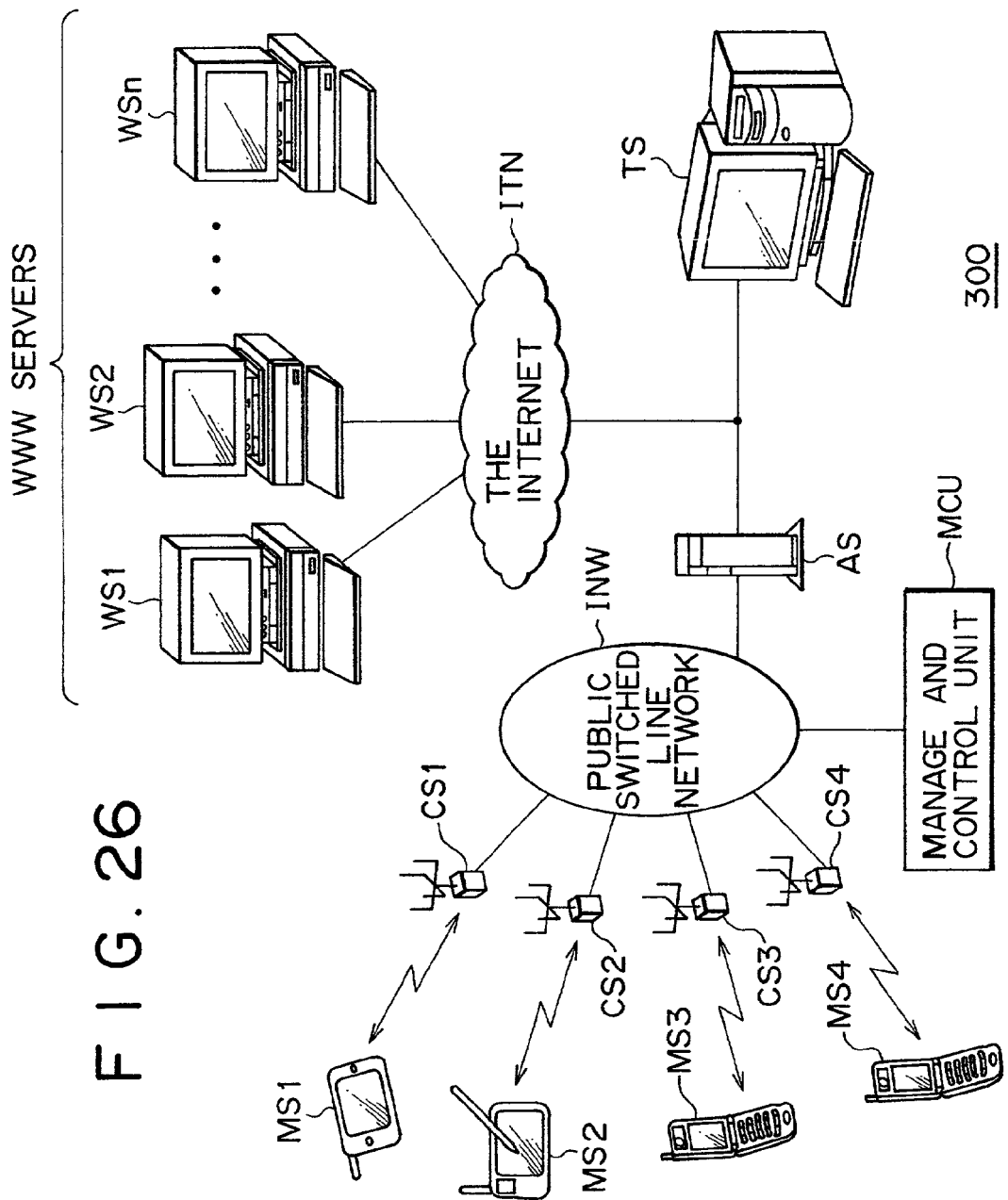
FIG. 26 is a schematic diagram illustrating an exemplary configuration of a network system to which a camera-attached digital mobile telephone MS3 practiced as a second embodiment of an information processing apparatus according to the invention is connected.

FIG. 26 shows a typical configuration of a network system 300 to which the camera-attached digital mobile telephone MS3 is connected.

In the network system 300, base stations CS1 through CS4, fixed radio stations, are arranged in cells obtained by dividing a communication service provision area to a desired size. The base stations CS1 through CS4, to which mobile information terminals MS1 and MS2 and camera-attached digital mobile telephones MS3 and MS4 are wirelessly connected by W-CDMA (Wideband Code Division Multiple Access), are adapted to communicate mass data at a maximum of 2 Mbits/second (Mbps) by use of 2 GHz frequency band.

Thus, because the mobile information terminals MS1 and MS2 and the camera-attached digital mobile telephones MS3 and MS4 are adapted to communicate mass data at high speeds supported by W-CDMA, they can not only exchange voice signals but also transfer electronic mail, browse simplified home pages, and transfer images for example.

Further, the base stations CS1 through CS4 are wired to a public switched line network INW to which the Internet ITN, many subscriber wired terminals, computer networks, and corporate networks are connected. The public switched line network INW is also connected to an access server AS of an Internet service provider. The AS is connected to a content server TS owned by the Internet service provider.

The content server TS provides content such as simplified home pages in the form of compact HTML files for example in response to the requests from the subscriber wired terminals, the mobile information terminals MS1 and MS2, and the camera-attached digital mobile telephones MS3 and MS4.

Besides, the Internet ITN is connected to many WWW servers WS1 through WSn to which the subscriber wired terminals, the mobile information terminals MS1 and MS2, and the camera-attached digital mobile telephones MS3 and MS4 can access.

It should be noted that the mobile information terminals MS1 and MS2 and the camera-attached digital mobile telephones MS3 and MS4 communicate with the base stations CS1 through CS4 by a 2 Mbps simplified transport protocol. The communication from the base stations CS1 through CS4 to the WWW servers WS1 through WSn via the Internet ITN is executed by TCP/IP.

A management control unit MCU is connected to the subscriber wired terminals, the mobile information terminals MS1 and MS2, and the camera-attached digital mobile telephones MS3 and MS4 via the public switched line network INW to execute authentication processing and accounting processing for the subscriber wired terminals, the mobile information terminals MS1 and MS2, and the camera-attached digital mobile telephones MS3 and MS4.

Figure 27:
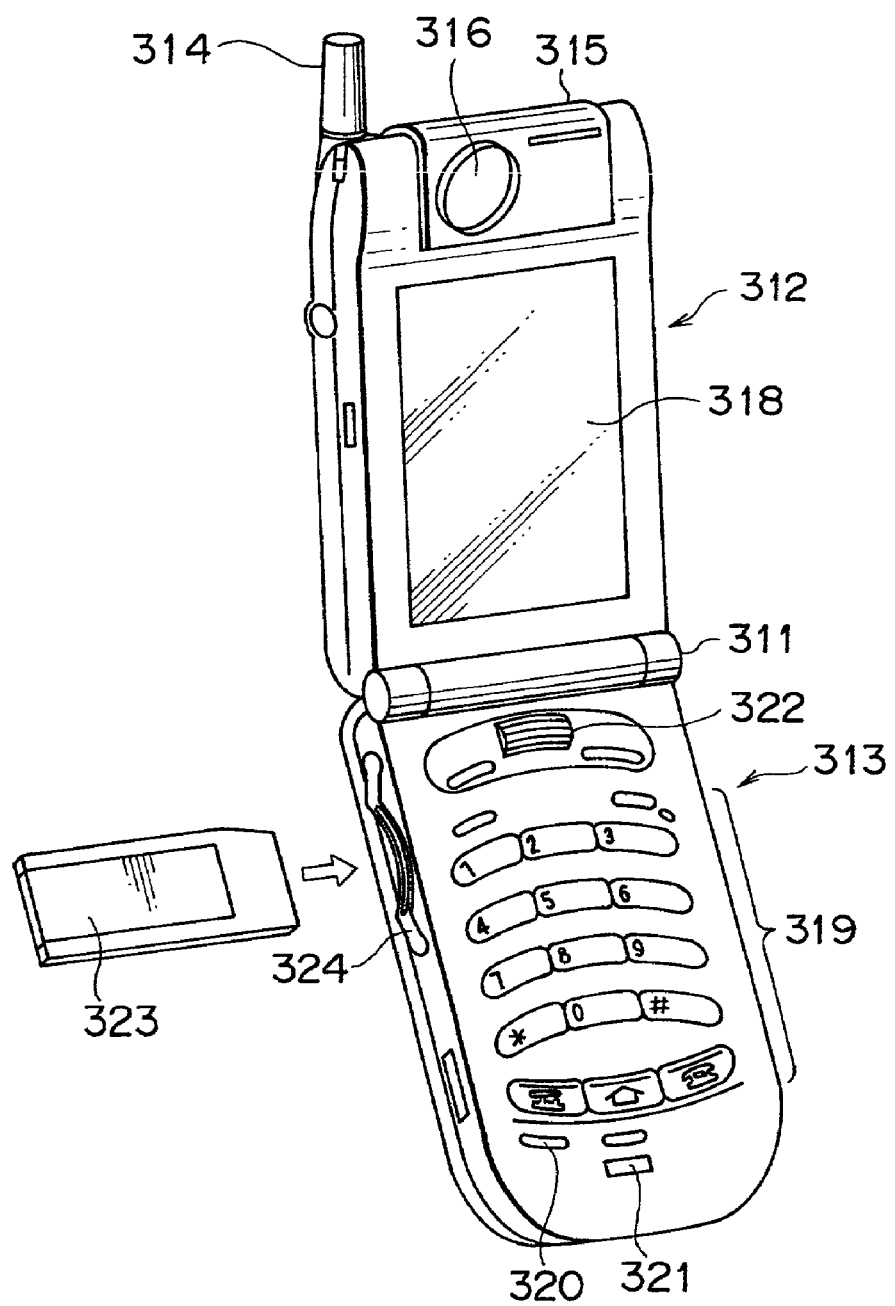
FIG. 27 illustrates an external view of the camera-attached digital mobile telephone MS3.

The following describes an external configuration of the camera-attached digital mobile telephone MS3 with reference to FIG. 27. The camera-attached digital mobile telephone MS3 is composed of a display section 312 and a main frame 313 with a hinge 311 therebetween. The MS3 is collapsible around the hinge 311.

The display section 312 is attached with a two-way antenna 314 at top left in a retractable manner through which the MS3 can transfer wireless signals with the base station CS3. The display section 312 is also attached with a camera section 315 at top center which is pivotable within a range of about 180 degrees. A CCD camera 316 of the camera section 315 takes images of desired objects.

Figure 28:
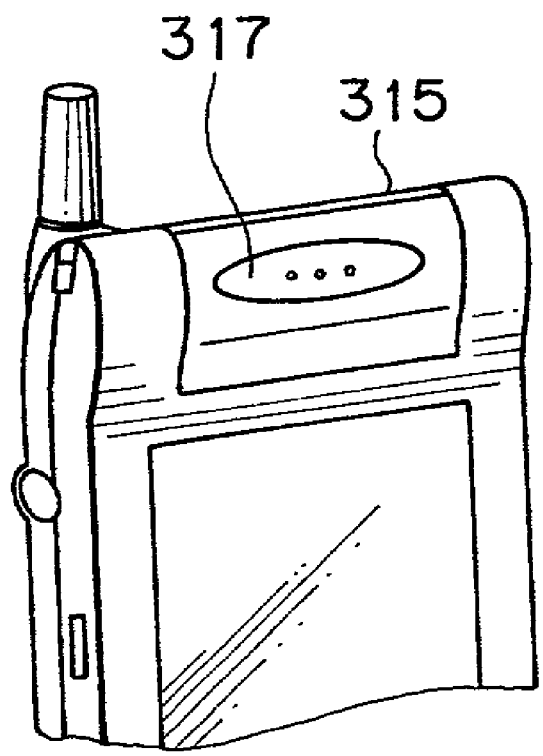
FIG. 28 illustrates a pivoting motion of a camera section 315 of the camera-attached digital mobile telephone MS3.

When the camera section 315 is positioned by the user by rotating it by about 180 degrees, a speaker 317 arranged at the rear center of the camera section 315 faces toward the user as shown in FIG. 28, thereby putting the MS3 into a normal voice talk mode.

Further, the display section 312 is attached with a liquid crystal display 318 at the front center which displays radio reception state, battery indicator, name and telephone number registered as telephone directory, origination log, electronic mail contents, simplified home page, and images taken by the CCD camera 316 of the camera section 315.

The main frame 313 has operator keys 319 including numeric keys 0 through 9, a call key, a redial key, an end/power key, a clear/electronic mail key on the front side. The user inputs various commands by operating these keys. The main frame 313 also has a memory button 320 and a microphone 321 under the operator keys 319. Pressing the memory button 320 can record the voice of other party and the microphone 321 picks up the voice of the user in the talk mode.

A rotative jog dial 322 is arranged on the main frame 313 at an upper side of the operator keys 319 in a slightly projecting manner from the surface of the main frame 313. In accordance with the rotation of the jog dial 322 by the user, the telephone directory list or electronic mail screen is scrolled, the simplified home pages are turned over, the images are moved, and other various operations can be performed on the liquid crystal display 318. For example, when the user selects a particular telephone number from a telephone directory displayed on the liquid crystal display 318 by operating the jog dial 322 and presses the jog dial 322 inside the main frame 313, the main frame 313 recognizes the selected telephone number to automatically performing a call originating process for the recognized telephone number.

A battery pack (not shown) is inserted in the main frame 313 at its rear side. When the talk end/power key is turned on, electric power is supplied to each circuit to make the MS3 ready for operation. A Memory Stick (trade mark) slot 324 is arranged at top left of the main frame 313 into which a Memory Stick is detachably loaded. When the memory button 320 is pressed, the voice of the other party during talk or electronic mail, a simplified home page, and an image taken by the CCD camera 316 may be recorded in the Memory Stick 323.

The Memory Stick 323 is a kind of flash memory card developed by Sony Corporation, applicant hereof. With the Memory Stick 323, a flash memory element, which is a kind of EEPROM (Electrically Erasable and Programmable Read Only Memory), i.e. a non-volatile memory capable of electrically rewriting and erasing, is housed in a plastic case 21.5 mm long×50 mm wide, 2.8 mm thick. Various data such as image, voice, and music can be read via a 10-pin terminal. The Memory Stick 323 employs a unique serial protocol which provides compatibility with the changed specifications of the built-in flash memory due to increase in storage capacity or with the type of target device. This unique serial protocol realizes a high-speed operations of a maximum write rate of 1.5 MB/second and a maximum read rate of 2.45 MB/second. The Memory Stick 323 has an erroneous delete prevention switch for high operational reliability.

Consequently, the camera-attached digital mobile telephone MS3 constituted such that the Memory Stick 323 is detachably loadable can share data with other electronic devices via the Memory Stick 323.

The following describes the electric circuit configuration of the camera-attached digital mobile telephone MS3 with reference to FIG. 29. With the camera-attached digital mobile telephone MS3, a main controller which totally controls each component of the display section 312 and the main frame 313 is connected to a power supply circuit 351, an operation input controller 352, an image encoder 353, a camera interface 354, an LCD (Liquid Crystal Display) controller 355, an image decoder 356, a multiplexer/demultiplexer 357, a recording/reproducing section 382, a modulator/demodulator 358, and a voice codec 359 via a main bus 360. The main controller 350 is also connected to an image encoder 353, an image decoder 356, a multiplexer/demultiplexer 357, a modulator/demodulator 358, and a voice codec 359 via a synchronous bus 361.

The power supply circuit 351, when the talk end/power key is turned on by the user, supplies power from the battery to each circuit, making the camera-attached digital mobile telephone MS3 ready for operation.

Under the control of the main controller 350 composed of a CPU, a ROM, a RAM and so on, the camera-attached digital mobile telephone MS3 converts a voice signal picked up by the microphone 321 in the voice talk mode into digital voice data through the voice codec 359, performs spread spectrum on the digital voice data through the modulator/demodulator 358, performs digital-to-analog conversion and frequency conversion through a sender/receiver 362, and transmits the resultant signal via the antenna 314. Also, the camera-attached digital mobile telephone MS3 amplifies a signal received at the antenna 314, performs frequency conversion and analog-to-digital conversion on the amplified signal, performs spread spectrum on the converted signal through the modulator/demodulator 358, converts the resultant signal into an analog voice signal through the voice codec, and outputs the analog voice signal to the speaker 317.

Further, when sending electronic mail in the data communication mode, the camera-attached digital mobile telephone MS3 sends the electronic mail text data inputted by operating the operation key 319 or the jog dial 322 to the main controller 350 via the operation input controller 352. The main controller 350 performs spread spectrum on the received text data through the modulator/demodulator 358, performs digital-to-analog conversion and frequency conversion on the text data through the sender/receiver 362, and sends the resultant signal to the base station CS3 via the antenna 314.

When receiving electronic mail in the data communication mode, the camera-attached digital mobile telephone MS3 performs reverse spread spectrum on a signal received from the base station CS3 via the antenna 314 to restore original text data and displays the original text data on the liquid crystal display 218 as electronic mail via the LCD controller 355. Then, the camera-attached digital mobile telephone MS3 can record the received electronic mail into the Memory Stick 323 via the recording/reproducing section 362 as required by the user.

When sending image data in the data communication mode, the camera-attached digital mobile telephone MS3 supplies the image data taken by the CCD camera 316 to the image encoder 353 through the camera interface 354. The image encoder 353 compresses and encodes the image data supplied from the CCD camera 316 by a predetermined coding scheme such as MPEG4 or MPEG4 and sends the resultant coded image data to the multiplexer/demultiplexer 357.

At the same time, the camera-attached digital mobile telephone MS3 sends a voice picked up by the microphone 321 while the CCD camera 316 is taking image to the multiplexer/demultiplexer 357 as digital voice data through the voice codec 359. The multiplexer/demultiplexer 357 multiplexes the coded image data supplied from the image encoder 353 and the voice data supplied from the voice codec 359 by a predetermined scheme, performs spread spectrum on the resultant multiplex data through the modulator/demodulator, performs digital-to-analog conversion and frequency conversion on the resultant signal through the sender/receiver 362, and sends the resultant signal via the antenna 314.

If no image data is being sent, the camera-attached digital mobile telephone MS3 can directly display the image data taken by the CCD camera 316 onto the liquid crystal display 318 via the camera interface 354 and the LCD controller 355.

In the data communication mode, for example, when receiving a moving image file data linked to a simplified home page for example, the camera-attached digital mobile telephone MS3 performs spread spectrum on the signal received from the base station CS3 via the antenna 314 through the modulator/demodulator 358 and sends the resultant signal to the multiplexer/demultiplexer 357. The multiplexer/demultiplexer 357 demultiplexes the multiplex data into coded image data and voice data, supplying the coded image data to the image decoder 356 via the synchronous bus 361 and the coded voice data to the voice codec 359. The image decoder 356 decodes the coded image data by a predetermined scheme into reproduced moving image data and supplies it to the liquid crystal display 318 via the LCD controller 355. Consequently, the moving image data included in the moving image file linked to a simplified home page for example is displayed on the liquid crystal display 318. At the same time, the voice codec 359 converts the voice data into an analog voice signal and supplies it to the speaker 317. Consequently, the voice data included in the moving image file linked to a simplified home page for example is sounded from the speaker 317.

Also, in this case, as with electronic mail, the camera-attached digital mobile telephone MS3 can record the data linked to a received simplified home page for example into the Memory Stick 323 through the recording/reproducing section 362.

In addition to the above-mentioned configuration, the camera-attached digital mobile telephone MS3 has computer programs, a recording/reproducing program 101 through a WWW browser 105 (FIG. 5) as with the personal computer 1 in the ROM of the main controller 350. As instructed by these computer programs, the camera-attached digital mobile telephone MS3 can perform the same operations as those performed by the personal computer 1.

A program storage medium for storing the above-mentioned computer programs, the recording/reproducing program 101 through the WWW browser 106, which are installed in the personal computer 1 or the camera-attached digital mobile telephone MS3 to be executed, may be implemented by package media such as floppy disk, CDROM (Compact Disc Read Only Memory), and DVD (Digital Versatile Disc) or a semiconductor memory or a magnetic disk for temporarily or permanently storing these programs.

The computer programs, the recording/reproducing program 101 through the WWW browser 106, may be stored in the program storage medium by use of wired or wireless communication such as local area network, the Internet, and digital satellite broadcasting or by use of various communication interfaces such as router and modem.

Further, the information processing apparatus according to the present invention may be applied to other information processing devices such as the mobile information terminal MS1 for example than the personal computer 1, which is the first embodiment of the invention, and the camera-attached digital mobile telephone MS3, which is the second embodiment of the invention.

It should be noted that the steps describing the programs to be stored in the program storage medium are not only executed in a time-dependent manner in the order described, but also in parallel or in a discrete manner.

The term system herein used denotes an entire unit constituted by a plurality of devices.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus which acquires preset-recording data for preset-recording a television program from a predetermined information providing apparatus via a network and, on the basis of said preset-recording data, controls preset-recording of said television program, comprising:

selecting means for selecting said television program to be preset-recorded;

transmitting means for transmitting television program identifying information for identifying said television program selected by said selecting means to said information providing apparatus;

receiving means for receiving said preset-recording data, keyword data, and first advertisement-associated data from said information providing apparatus in response to said television program identifying information and second advertisement-associated data from said information providing apparatus in response to said keyword data;

recording means for recording said television program to an information recording medium on the basis of said received preset-recording data received by said receiving means;

reproducing means for reproducing said television program recorded to said information recording medium by said recording means; and display control means for controlling the displaying of said first and second advertisement-associated data received by said receiving means to force the display of said first and second advertisement-associated data substantially at the same time to force a viewer to playback said first and second advertisement-associated data while simultaneously playing back said television program, wherein said display control means displays the first advertisement-associated data in a first window beside a display of the preset-recording data and displays the second advertisement associated data in a second window below said first window, said first window including a recording preset-recording execute button, wherein said preset-recording execute button is enabled to control recording of said television program after completion of display of the first advertisement-associated data.

2. The information processing apparatus according to claim 1, wherein said display control means controls the displaying of said advertisement-associated data received by said receiving means at least during the reproduction of said television program by said reproducing means.

3. An information processing method for an information processing apparatus which acquires preset-recording data for preset-recording a television program from a predetermined information providing apparatus via a network and, on the basis of said preset-recording data, controls preset-recording of said television program, said information processing method comprising the steps of:

selecting said television program to be preset-recorded;

transmitting television program identifying information for identifying said television program selected in the selecting step to said information providing apparatus;

receiving said preset-recording data, keyword data, and first advertisement-associated data from said information providing apparatus in response to said television program identifying information and second advertisement-associated data from said information providing apparatus in response to said keyword data;

recording said television program to an information recording medium on the basis of said preset-recording data received in the receiving step;

reproducing said television program recorded to said information recording medium in the recording step; and controlling the displaying of said first and second advertisement-associated data received by said receiving means to force the display of said first and second advertisement-associated data substantially at the same time to force a viewer to playback said first and second advertisement-associated data while simultaneously playing back said television program, wherein said displaying is controlled to display the first advertisement-associated data in a first window beside a display of the preset-recording data and display the second advertisement associated data in a second window below said first window, said first window including a recording preset-recording execute button, and enabling said preset-recording execute button to control recording of said television program after completion of display of the first advertisement-associated data.

4. A program storage medium storing a computer-readable program for controlling an information processing apparatus which acquires preset-recording data for preset-recording a television program from a predetermined information providing apparatus via a network and, on the basis of said preset-recording data, controls preset-recording of said television program, said computer-readable program comprising the steps of:

selecting said television program to be preset-recorded;

transmitting television program identifying information for identifying said television program selected in the selecting step to said information providing apparatus;

receiving said preset-recording data, keyword data, and first advertisement-associated data from said information providing apparatus in response to said television program identifying information and second advertisement-associated data from said information providing apparatus in response to said keyword data;

recording said television program to an information recording medium on the basis of said preset-recording data received in the receiving step;

reproducing said television program recorded to said information recording medium in the recording step;

controlling the displaying of said first and second advertisement-associated data received in the receiving step to force the display of said first and second advertisement-associated data substantially at the same time to force a viewer to playback said first and second advertisement-associated data while simultaneously playing back said television program, wherein said displaying is controlled to display the first advertisement-associated data in a first window beside a display of the preset-recording data and display the second advertisement associated data in a second window below said first window, said first window including a recording preset-recording execute button, and enabling said preset-recording execute button to control recording of said television program after completion of display of the first advertisement-associated data.

5. An information processing apparatus which acquires preset-recording data for preset-recording a television program from a predetermined information providing apparatus via a network and, on the basis of said preset-recording data, controls preset-recording of said television program, comprising:

selecting means for selecting said television program to be preset-recorded;

transmitting means for transmitting television program identifying information for identifying said television program selected by said selecting means to said information providing apparatus;

first receiving means for receiving first advertisement-associated data and keyword data from said information providing apparatus in response to said television program identifying information and second advertisement-associated data from said information providing apparatus in response to said keyword data;

notification means for notifying said information providing apparatus if a predetermined condition is satisfied after display of said first and second advertisement-associated data is started;

second receiving means for receiving said preset-recording data from said information providing apparatus in response to the notification from said notifying means;

recording means for recording said television program to an information recording medium on the basis of said preset-recording data received by said second receiving means; and display control means for controlling the displaying of said first and second advertisement-associated data received by said first receiving means to force the display of said first and second advertisement-associated data to force a viewer to view at least one of said first and second advertisement-associated data before receiving said preset- recording data by said second receiving means, wherein said display control means displays the first advertisement-associated data in a first window beside a display of the preset-recording data and displays the second advertisement associated data in a second window below said first window, said first window including a recording preset-recording execute button, wherein said preset-recording execute button is enabled to control recording of said television program after completion of display of the first advertisement-associated data, wherein said viewer cannot view said television program unless said first and second advertisement-associated data first has been displayed.

6. The information processing apparatus according to claim 5, wherein
said predetermined condition is a predefined correlation between television program and advertisement.

7. The information processing apparatus according to claim 5, wherein
said predetermined condition is a predefined correlation between television program keyword and advertisement.

8. The information processing apparatus according to claim 5, further comprising:
reproducing means for reproducing said television program recorded to said information recording medium by said recording means.

9. The information processing apparatus according to claim 8, wherein
said display control means controls the displaying of said advertisement-associated data received by said first receiving means while said reproducing means is reproducing said television program.

10. An information processing method for an information processing apparatus which acquires preset-recording data for preset-recording a television program from a predetermined information providing apparatus via a network and, on the basis of said preset-recording data, controls preset-recording of said television program, said information processing method comprising the steps of:
selecting said television program to be preset-recorded;
transmitting television program identifying information for identifying said television program selected in the selecting step to said information providing apparatus;
receiving first advertisement-associated data and keyword data from said information providing apparatus in response to said television program identifying information and second advertisement-associated data from said information providing apparatus in response to said keyword data;
notifying said information providing apparatus if a predetermined condition is satisfied after display of said first and second advertisement-associated data is started;
receiving said preset-recording data from said information providing apparatus in response to the notification from the notifying step;
recording said television program to an information recording medium on the basis of said preset-recording data received in the second receiving step; and
controlling the displaying of said received first and second advertisement-associated data to force the display of said first and second advertisement-associated data to force a viewer to view at least one of said first and second advertisement-associated data before receiving said preset-recording data, wherein said displaying is controlled to display the first advertisement-associated data in a first window beside a display of the preset-recording data and display the second advertisement associated data in a second window below said first window, said first window including a recording preset-recording execute button, and enabling said preset-recording execute button to control recording of said television program after completion of display of the first advertisement-associated data, wherein said viewer cannot view said television program unless said advertisement-associated data first has been displayed.

11. The information processing method according to claim 10, wherein
said predetermined condition is a predefined correlation between television program and advertisement.

12. The information processing method according to claim 10, wherein
said predetermined condition is a predefined correlation between television program keyword and advertisement.

13. A computer-readable medium encoded with a computer-readable program for controlling an information processing apparatus which acquires preset-recording data for preset-recording a television program from a predetermined information providing apparatus via a network and, on the basis of said preset-recording data, controls preset-recording of said television program, said computer-readable program comprising the steps of:
selecting said television program to be preset-recorded;
transmitting television program identifying information for identifying said television program selected in the selecting step to said information providing apparatus;
receiving first advertisement-associated data and keyword data from said information providing apparatus in response to said television program identifying information and second advertisement-associated data from said information providing apparatus in response to said keyword data;
notifying said information providing apparatus if a predetermined condition is satisfied after display of said first and second advertisement-associated data is started;
receiving said preset-recording data from said information providing apparatus in response to the notification from the notifying step; and
recording said television program to an information recording medium on the basis of said preset-recording data received in the second receiving step; and
controlling the displaying of said received first and second advertisement-associated data to force the display of said first and second advertisement-associated data as a function of the keyword data to force a viewer to view at least one of said first and second advertisement-associated data before receiving said preset-recording data, wherein said displaying is controlled to display the first advertisement-associated data in a first window beside a display of the preset-recording data and display the second advertisement associated data in a second window below said first window, said first window including a recording preset-recording execute button, and enabling said preset-recording execute button to control recording of said television program after completion of display of the first advertisement-associated data, wherein said viewer cannot view said television program unless said first and second advertisement-associated data first has been displayed.

14. The program storage medium according to claim 13, wherein
said predetermined condition is a predefined correlation between a television program and an advertisement.

15. The program storage medium according to claim 13, wherein
said predetermined condition is a predefined correlation between television program keyword and advertisement.

16. An information providing apparatus which provides preset-recording data for preset-recording a television program to an information processing apparatus via a network, comprising:
receiving means for receiving a television program identifying information from said information processing apparatus;
generating means for generating said preset-recording data for preset-recording said television program corresponding to said television program identifying information;
acquiring means for acquiring first advertisement-associated data corresponding to said television program identifying information from a predetermined site and acquiring second advertisement-associated data from said information providing apparatus in response to said keyword data from the predetermined site;
first transmitting means for transmitting said first and second advertisement-associated data and keyword data acquired by said acquiring means to said information processing apparatus to force display of said first and second advertisement-associated data; and
second transmitting means for transmitting said preset-recording data generated by said generating means to said information processing apparatus after said first and second advertisement-associated data has been displayed on said information processing apparatus,
wherein said information processing apparatus is controlled to display the first advertisement-associated data in a first window beside a display of the preset-recording data and display the second advertisement associated data in a second window below said first window, said first window including a recording preset-recording execute button, and
wherein said preset-recording execute button is enabled to control recording of said television program after completion of display of the first advertisement-associated data.

17. The information providing apparatus according to claim 16, wherein
said acquiring means acquires first advertisement-associated data preset to said television program corresponding to said television program identifying information from a first site.

18. The information providing apparatus according to claim 16, wherein
said acquiring means acquires a keyword preset to said television program from a second site and second advertisement-associated data corresponding to said keyword from said first site.

19. The information providing apparatus according to claim 18, wherein
said transmitting means also transmits said keyword to said information processing apparatus.

20. An information providing method for an information providing apparatus which provides preset-recording data for preset-recording a television program to an information processing apparatus via a network, said information providing method comprising the steps of:
receiving a television program identifying information from said information processing apparatus;
generating said preset-recording data for preset-recording said television program corresponding to said television program identifying information;
acquiring first advertisement-associated data and keyword data corresponding to said television program identifying information from a predetermined site and acquiring second advertisement-associated data from said information providing apparatus in response to said keyword data;
transmitting said acquired first and second advertisement-associated data to said information processing apparatus to force display said of first and second advertisement-associated data; and
transmitting said preset-recording data to said information processing apparatus after said first and second advertisement-associated data has been displayed on said information processing apparatus,
wherein said information processing apparatus is controlled to display the first advertisement-associated data in a first window beside a display of the preset-recording data and display the second advertisement associated data in a second window below said first window, said first window including a recording preset-recording execute button, and
wherein said preset-recording execute button is enabled to control recording of said television program after completion of display of the first advertisement-associated data.

21. A computer-readable medium encoded with a computer-readable program for controlling an information providing apparatus which provides preset-recording data for preset-recording a television program to an information processing apparatus via a network, said computer-readable program comprising the steps of:
receiving a television program identifying information from said information processing apparatus;
generating said preset-recording data for preset-recording said television program corresponding to said television program identifying information;
acquiring first advertisement-associated data corresponding to said television program identifying information from a predetermined site and acquiring second advertisement-associated data from said information providing apparatus in response to said keyword data;
transmitting said acquired first and second advertisement-associated data and keyword data to said information processing apparatus to force display said of first and second advertisement-associated data; and
transmitting said preset-recording data to said information processing apparatus after said first and second advertisement-associated data has been displayed on said information processing apparatus,
wherein said information processing apparatus is controlled to display the first advertisement-associated data in a first window beside a display of the preset-recording data and display the second advertisement associated data in a second window below said first window, said first window including a recording preset-recording execute button, and
wherein said preset-recording execute button is enabled to control recording of said television program after completion of display of the first advertisement-associated data.

* * * * *

UNITED STATES PATENT AND TRADEMARK OFFICE
CERTIFICATE OF CORRECTION

PATENT NO. : 7,620,965 B2 Page 1 of 1
APPLICATION NO. : 09/911911
DATED : November 17, 2009
INVENTOR(S) : Miyazaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1631 days.

Signed and Sealed this

Twenty-sixth Day of October, 2010

David J. Kappos
*Director of the United States Patent and Trademark Office*